US012707418B2

(12) United States Patent
Reddy et al.

(10) Patent No.: US 12,707,418 B2
(45) Date of Patent: Aug. 11, 2026

(54) CENTRALIZED TIME SYNCHRONIZATION FOR TIME DIFFERENCE OF ARRIVAL (TDOA) USING ULTRA-WIDEBAND (UWB)

(71) Applicant: QUALCOMM Incorporated, San Diego, CA (US)

(72) Inventors: Varun Amar Reddy, San Diego, CA (US); Alexandros Manolakos, Escondido, CA (US); Pooria Pakrooh, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 18/172,605

(22) Filed: Feb. 22, 2023

(65) Prior Publication Data

US 2023/0276401 A1 Aug. 31, 2023

Related U.S. Application Data

(60) Provisional application No. 63/268,591, filed on Feb. 25, 2022.

(51) Int. Cl.
*H04W 64/00* (2009.01)

(52) U.S. Cl.
CPC .................................. *H04W 64/00* (2013.01)

(58) Field of Classification Search
CPC .. H04W 64/00; G01S 5/0205; G01S 5/02216; G16Y 40/60
See application file for complete search history.

(56) References Cited

U.S. PATENT DOCUMENTS 11,070,348 B1 * 7/2021 Huang .................. H04W 40/02
11,385,320 B2 * 7/2022 Al-kadi ..................... G01S 5/06
(Continued)

FOREIGN PATENT DOCUMENTS

EP 2745135 B1 5/2020

OTHER PUBLICATIONS

Chen X., et al., "Network Scalability with Weight Analysis Based on UWB Indoor Positioning System", 2016 IEEE Conference on Wireless Sensors (ICWISE), IEEE, Oct. 10, 2016, pp. 95-99, XP033269498, DOI: 10.1109/ICWISE.2016.8188549, Sections II and III.

(Continued)

*Primary Examiner* — Umair Ahsan
(74) *Attorney, Agent, or Firm* — Weaver Austin Villeneuve & Sampson LLP/QUALCOMM Incorporated

(57) ABSTRACT

In some implementations, a server may obtain metric information from each of a group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof. The server may select the synchronization reference anchor from the group of RF positioning anchors based at least in part on the metric information. The server may transmit information indicative of the selected synchronization reference anchor to each RF positioning anchor of the group of RF positioning anchors.

27 Claims, 12 Drawing Sheets

(56) References Cited

U.S. PATENT DOCUMENTS

| | | | | |
|---|---|---|---|---|
| 2005/0058153 | A1* | 3/2005 | Santhoff | H04W 28/18 370/310 |
| 2009/0122782 | A1* | 5/2009 | Horn | H04W 56/001 370/350 |
| 2012/0250704 | A1* | 10/2012 | Yamada | H04J 3/0661 370/503 |
| 2019/0007919 | A1* | 1/2019 | Petrus | H04W 56/0025 |
| 2021/0103023 | A1 | 4/2021 | Al-Kadi et al. | |
| 2023/0116776 | A1* | 4/2023 | Lee | H01Q 15/00 370/329 |
| 2023/0194695 | A1* | 6/2023 | Janssens | G01S 13/76 342/27 |
| 2023/0276403 | A1* | 8/2023 | Reddy | H04L 5/0048 455/456.1 |

OTHER PUBLICATIONS

Friedrich J., et al., "Accurate Multi-Zone UWB TDOA Localization Utilizing Cascaded Wireless Clock Synchronization", 2021 International Conference on Indoor Positioning and Indoor Navigation (IPIN), IEEE, Nov. 29, 2021, Nov. 29-Dec. 2, 2021, Lloret de Mar, Spain, 8 Pages, XP033997276.

International Search Report and Written Opinion—PCT/US2023/063101—ISA/EPO—Jun. 5, 2023.

Navratil V., et al., "Chained Wireless Synchronization Algorithm for UWB-TDOA Positioning", 2018 IEEE/ION Position, Location and Navigation Symposium (Plans), IEEE, Apr. 23, 2018, pp. 149-157, XP033353939.

* cited by examiner

CENTRALIZED TIME SYNCHRONIZATION FOR TIME DIFFERENCE OF ARRIVAL (TDOA) USING ULTRA-WIDEBAND (UWB)

RELATED APPLICATIONS

This application claims the benefit of U.S. Provisional Application No. 63/268,591, filed Feb. 25, 2022, entitled "CENTRALIZED TIME SYNCHRONIZATION FOR TDOA USING UWB", which is assigned to the assignee hereof, and incorporated herein in its entirety by reference.

BACKGROUND

1. Field of Disclosure

The present disclosure relates generally to the field of radiofrequency (RF)-based position determination (or positioning) of an electronic wireless device. More specifically, the present disclosure relates to ultra-wideband (UWB)-based positioning.

2. Description of Related Art

UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. UWB-based positioning may be facilitated by groups or "clusters" of UWB devices known as "anchors." For certain types of positioning, such as time difference of arrival (TDOA), the respective clocks of these anchors may be synchronized to provide for precise transmission of signals, relative to each other.

BRIEF SUMMARY

An example method of designating a synchronization reference anchor for a group of radio frequency (RF) positioning anchors to enable downlink Time Difference of Arrival (DL-TDoA) positioning of mobile devices, according to this disclosure, may comprise obtaining, at a server, metric information from each RF positioning anchor of the group of RF positioning anchors, wherein the metric information of a respective RF positioning anchor comprises information regarding a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof. The method also may comprise selecting, at the server, the synchronization reference anchor from the group of RF positioning anchors based at least in part on the metric information. The method also may comprise transmitting information indicative of the selected synchronization reference anchor to each RF positioning anchor of the group of RF positioning anchors.

An example server comprising: a transceiver, a memory, one or more processors communicatively coupled with the transceiver and the memory, wherein the one or more processors are configured to obtain metric information from each radio frequency (RF) positioning anchor of a group of RF positioning anchors, wherein the metric information of a respective RF positioning anchor comprises information regarding a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof. The one or more processors further may be configured to select a synchronization reference anchor from the group of RF positioning anchors based at least in part on the metric information. The one or more processors further may be configured to transmit, via the transceiver, information indicative of the selected synchronization reference anchor to each RF positioning anchor of the group of RF positioning anchors.

An example apparatus for designating a synchronization reference anchor for a group of radio frequency (RF) positioning anchors to enable downlink Time Difference of Arrival (DL-TDoA) positioning of mobile devices, according to this disclosure, may comprise means for obtaining metric information from each RF positioning anchor of the group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof. The apparatus further may comprise means for selecting the synchronization reference anchor from the group of RF positioning anchors based at least in part on the metric information. The apparatus further may comprise means for transmitting information indicative of the selected synchronization reference anchor to each RF positioning anchor of the group of RF positioning anchors.

According to this disclosure, an example non-transitory computer-readable medium stores instructions for designating a synchronization reference anchor for a group of radio frequency (RF) positioning anchors to enable downlink Time Difference of Arrival (DL-TDoA) positioning of mobile devices, the instructions comprising code for obtaining metric information from each RF positioning anchor of the group of RF positioning anchors, wherein the metric information of a respective RF positioning anchor comprises information regarding. The instructions further may comprise code for a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof. The instructions further may comprise code for selecting the synchronization reference anchor from the group of RF positioning anchors based at least in part on the metric information. The instructions further may comprise code for transmitting information indicative of the selected synchronization reference anchor to each RF positioning anchor of the group of RF positioning anchors.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The appended drawings are provided to complement the following description. It can be noted that, the term "background" is included in the text of many of the appended drawings to provide context for the embodiments described herein. It does not necessarily follow, however, that such information should be considered prior art. Some information identified as background in the appended drawings may, in fact, comprise novel features used by one or more embodiments described herein.

Figure 1:
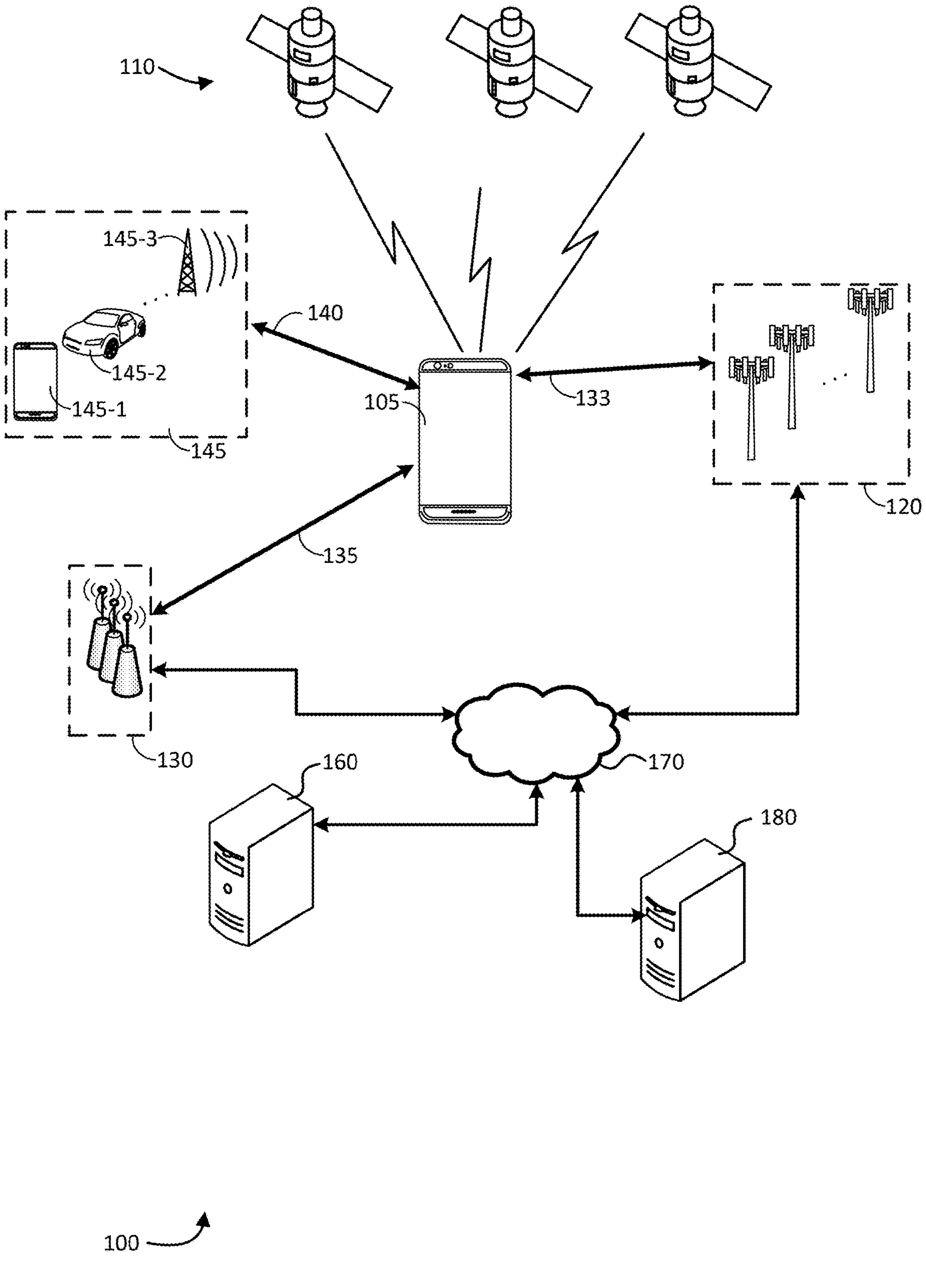
FIG. 1 is a diagram of a positioning system.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "positioning reference signals," "reference signals for positioning," and the like may be used to refer to signals used for positioning of a mobile device, such as a UWB device. As described in more detail herein, such signals may comprise any of a variety of signal types. Additionally, unless otherwise specified, references to "sensing reference signals," "reference signals for sensing," and the like may be used to refer to signals used for RF sensing (also generically referred to herein as "sensing") as described herein. A signal used for RF sensing and/or positioning may be generally referred to herein as a reference signal (RS). As described in more detail herein, such signals may comprise any of a variety of signal types but may not necessarily be limited to signals solely used for RF sensing.

Further, unless otherwise specified, the term "positioning," "position determination," "location determination," "location estimation," and the like, as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. UWB-based positioning may be facilitated by groups or "clusters" of UWB devices known as "anchors." For certain types of positioning, such as time difference of arrival (TDOA), the respective clocks of these anchors may be synchronized to provide for precise transmission of signals, relative to each other. Time synchronization of a network of overlapping clusters may be provided by a Global-anchor. However, traditional means for selecting a Global-anchor can be inefficient, and if a cluster network expands/changes, the need may arise for selecting a new Global-anchor that may be more effective at providing time synchronization for the changed network. To address these and other issues, embodiments herein provide techniques by which a Global-anchor cluster network can be selected by a central device, such as a server.

Various aspects of this disclosure relate generally to positioning or ranging, particularly using UWB. Some aspects more specifically relate to the selection of a new Global-anchor for time synchronization in a network of UWB clusters. In some examples, a server may obtain one or more criteria for Global-anchor selection, which may be in addition to the number of hops between nodes and the number of nodes in the network. The server may determine a weighted-closeness centrality (CC) value of different prospective Global-anchors based on a weighted sum of these criteria and select a new candidate Global-anchor accordingly. Moreover, according to embodiments herein, the Global-anchor can notify the candidate Global-anchor, which can send acknowledgment whether anchors in the network. To facilitate the scalability of the propagation of information within the cluster network, a new round structure may be implemented.

Particular aspects of the subject matter described in this disclosure can be implemented to realize one or more of the following potential advantages. In some examples, by using a CC value, the described techniques can provide for the selection of a Global-anchor by a server that may be better suited for time synchronization and traditional techniques, enabling more accurate positioning. These and other advantages will be apparent to a person of ordinary skill in the art in view of the embodiments described herein. Embodiments are described below, following a review of applicable technology.

Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

FIG. 1 is a simplified illustration of a positioning system 100 in which a mobile device 105, location server 160, and/or other components of the positioning system 100 can use the techniques provided herein for positioning of a mobile device 105, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate the location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIGS. 2A and 2B.

It should be noted that FIG. 1 provides only a generalized illustration of various components, any or all of which may be utilized as appropriate, and each of which may be duplicated, as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. A mobile device of a cellular network (e.g., LTE and/or NR) also may be referred to as a User Equipment (UE).

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise UEs communicatively coupled with a cellular or other mobile network (e.g., network 170). When one or more other mobile devices 145 comprising UEs are used in the position determination of a particular mobile device 105, the mobile device 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. As described hereafter, UWB may be one such technology by which the positioning of a target device (e.g., mobile device 105) may be facilitated using measurements from one or more anchor devices (e.g., mobile devices 145). Measurements of distance between the target device and one or more anchor devices may be referred to herein as "ranging."

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate," "estimated location," "location," "position," "position estimate," "position fix," "estimated position," "location fix" or "fix." The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

As noted, positioning of the mobile device 105 may be facilitated by a location server 160, which may be part of a cellular network. Additionally or alternatively, the location server 160 may be capable of facilitating other types of network-based positioning, including positioning using APs 130 (e.g., Wi-Fi positioning) and/or mobile devices 145 (e.g., Bluetooth positioning, UWB positioning, etc.). To do so, the location server 160 may communicate with one or more devices (e.g., a target device such as the mobile device 105 and/or one or more anchor devices), coordinate positioning sessions with the one or more devices, provide assistance data for positioning-related measurements and/or calculations, receive measurement data from one or more devices for determining a position of a target device, provide synchronization-related data, or perform a combination these tasks, for example. According to some embodiments, the location server 160 may support various procedures/methods such as Assisted GNSS (A-GNSS), Time Difference Of Arrival (TDoA or TDOA) (which also may be referred to as Observed Time Difference Of Arrival (OTDoA)), Real Time Kinematic (RTK), Precise Point Positioning (PPP), Differential GNSS (DGNSS), Enhance Cell ID (ECID), angle of arrival (AoA), angle of departure (AoD), WLAN positioning, RTT, multi-cell RTT, two-way ranging (TWR) (e.g., including single-sided TWR (SS-TWR) and/or double-sided TWR (DS-TWR)), and/or other positioning procedures and methods. The location server 160 may process location service requests for the mobile device 105 and/or third parties (e.g., a device communicatively coupled with the location server 160 and authorized to receive a position of the mobile device 105).

To support various positioning procedures/methods, the mobile device 105 and/or one or more anchor devices may be capable of performing any of a variety of measurements and/or procedures. This can include, for example, Received Signal Strength Indicator (RSSI), RTT, Reference Signal Received Power (RSRP), Reference Signal Received Quality (RSRQ), Reference Signal Time Difference (RSTD), Time of Arrival (ToA), AoA, Receive Time-Transmission Time Difference (Rx-Tx), Differential AoA (DAoA), AoD, or Timing Advance (TA).

In some embodiments, TDoA assistance data may be provided to a mobile device 105 by the location server 160 for a reference signal and one or more response or neighbor signals, relative to the reference signal. For example, the assistance data may provide timing, frequency, and/or other parameters of the reference and response/neighbor signals to allow a device (e.g., a target and/or anchor) to perform ToA and/or RSTD measurements for TDoA positioning. Using the RSTD measurements, the known absolute or relative transmission timing of each cell, and the known position(s) of wireless node physical transmitting antennas (e.g., anchors) for the reference and response/neighbor signals, the UE position may be calculated (e.g., by the mobile device 105 or by the location server 160). More particularly, the RSTD for a neighbor signal "k" relative to a reference signal "Ref," may be given as ($ToA_k - ToA_{Ref}$). ToA measurements for different signals may then be converted to RSTD measurements and sent to the location server 160 by the mobile device 105. Using (i) the RSTD measurements, (ii) the known absolute or relative transmission timing of each cell, (iii) the known position(s) of physical transmitting antennas that transmit the reference and response/neighbor signals, and/or (iv) directional characteristics of the signals such as a direction of transmission, the mobile device 105 position may be determined.

With regard to UWB-based positioning, UWB devices may conduct "sessions" during which the devices engage in direct communications (e.g., D2D communications) to coordinate the exchange of ranging frames from which ToA may be determined. Further, different types of measurements may be performed during these sessions to conduct the UWB-based position. A discussion of FIGS. 2A and 2B below provide examples of what types of measurements may be performed. A discussion of other figures below provides additional details regarding UWB positioning sessions.

UWB devices may vary in form and function. As indicated in FIG. 1, a UWB device may comprise a mobile device such as a mobile phone with UWB functionality. Similarly, UWB devices may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB devices may also comprise tracking devices used in logistical applications to track packages, shipping containers, or the like. Additionally or alternatively, UWB devices (such as UWB anchors, described hereafter) may comprise proprietary and/or dedicated RF beacons deployed at known locations for monitoring the location of tags or devices used in logistical applications and/or tracking applications (e.g., in a factory, warehouse, hospital, etc.). UWB devices may be used in proximity applications to, for example, unlock the door as a user (e.g., an authorized user) approaches. UWB devices may also be used in other applications and/or device types. Some UWB devices may also be deployed in a factory setting to monitor robots, assembled parts, or the like.

Figure 2A:
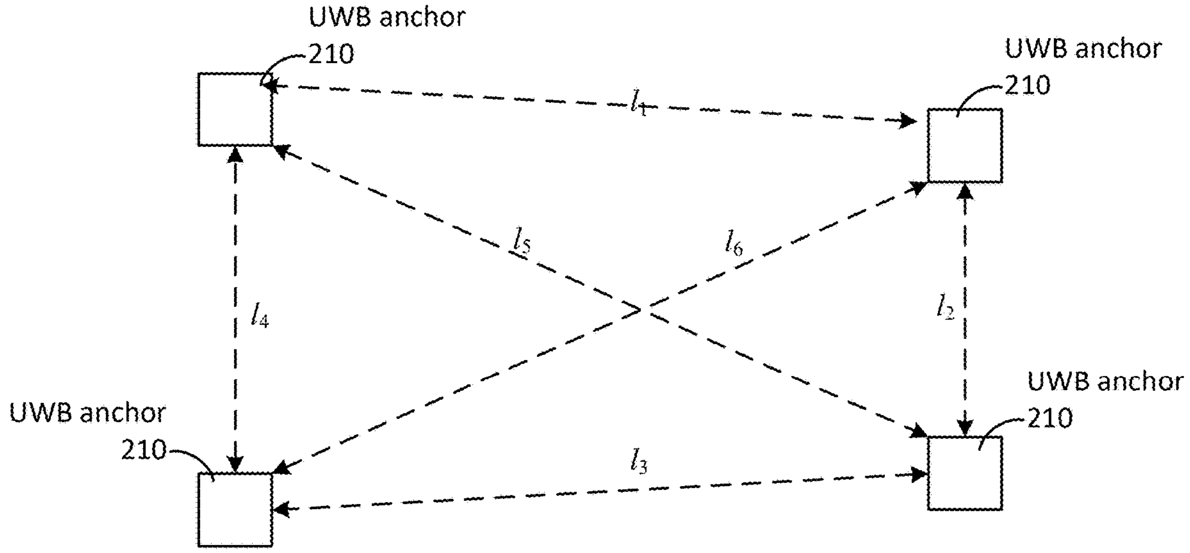
FIGS. 2A and 2B are simplified diagrams illustrating how ultra-wideband (UWB) positioning may be performed in a group of UWB anchors, according to some embodiments.
Figure 2B:
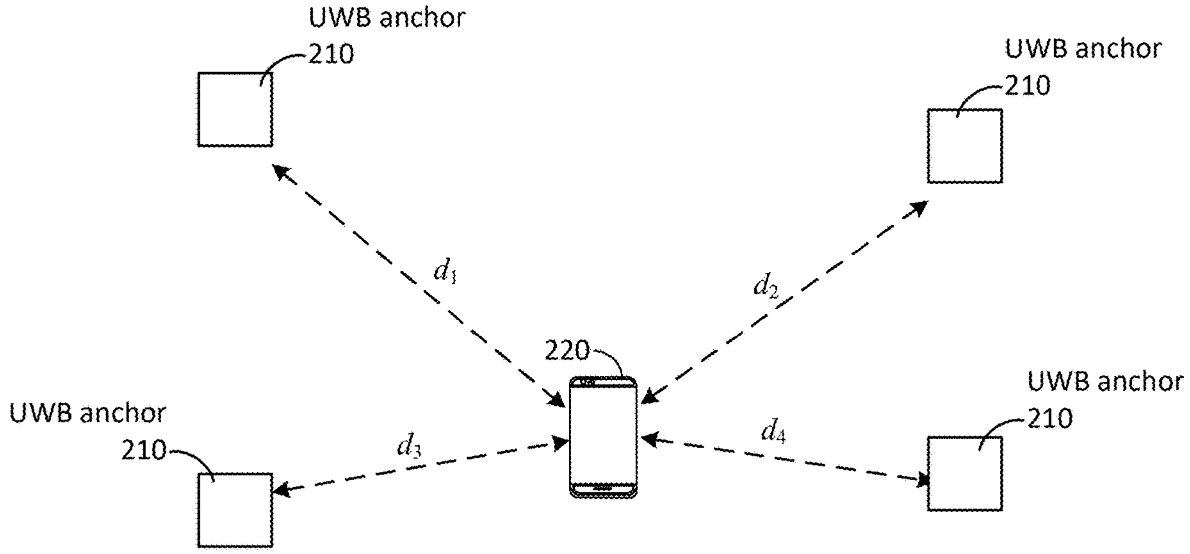

FIGS. 2A and 2B are simplified diagrams illustrating how UWB positioning may be performed in a group of UWB anchors 210. As noted, anchor devices (referred to herein as "anchors" or "UWB anchors") may comprise UWB devices with known locations that can be used to determine the position of a target 220, or "tag," using UWB RF signals. UWB positioning may be performed utilizing relevant standards (e.g., IEEE 802.15.4ab), which enable high-accuracy, low-power positioning. One or more of the UWB anchors 210 and/or UWB target 220 may be connected with a network, such as in the manner illustrated in the positioning system 100 of FIG. 1. In some embodiments, the UWB anchors 210 and/or UWB target 220 may form an ad-hoc network, which may or may not be connected with a network (e.g., in the manner shown in FIG. 1). Further, the UWB anchors 210 and/or UWB target 220 may comprise any of a variety of device types, as previously indicated.

If the position of one or more UWB anchors 210 is not yet known, such as in an ad-hoc network, initial provisioning of the UWB anchors 210 may be performed. In the provisioning, UWB anchors 210 may perform ranging measurements to determine relative distances (l1-l6) between UWB anchors 210, as illustrated in FIG. 2A. This can enable the UWB anchors 210 to determine the relative locations with one another and, if the absolute location of any UWB anchor 210 is known, the absolute locations (e.g., with respect to a coordinates system). Once the positions of the UWB anchors 210 is known, the determination of location of a target 220 can be made by determining the distances (d1-d6) between the UWB anchors 210 and target 220. These distances can be determined using a variety of positioning-related measurements and/or procedures. This can include, for example, RSTD, ToA, two-way ranging (TWR) (e.g., single-sided TWR (SS-TWR) and/or double-sided TWR (DS-TWR)), TDoA, and more. Additionally or alternatively, angle-based measurements may be made for positioning of the target 220, including angle of arrival (AoA) and/or Angle of departure (AoD).

As noted group of UWB anchors 210 may conduct sessions in which UWB anchors 210 perform a series of operations to determine the position of one or more of the devices, and during which the UWB anchors 210 engage in direct communications (e.g., D2D communications) to coordinate the exchange of data, synchronize (e.g., for TDoA positioning). A group of UWB anchors 210 may be called a "cluster," and a network of UWB devices may comprise multiple clusters. Each cluster may include any number of UWB anchors 210, and different clusters may overlap, such that one or more UWB anchors 210 may be a part of one or more different clusters.

Figure 3A:
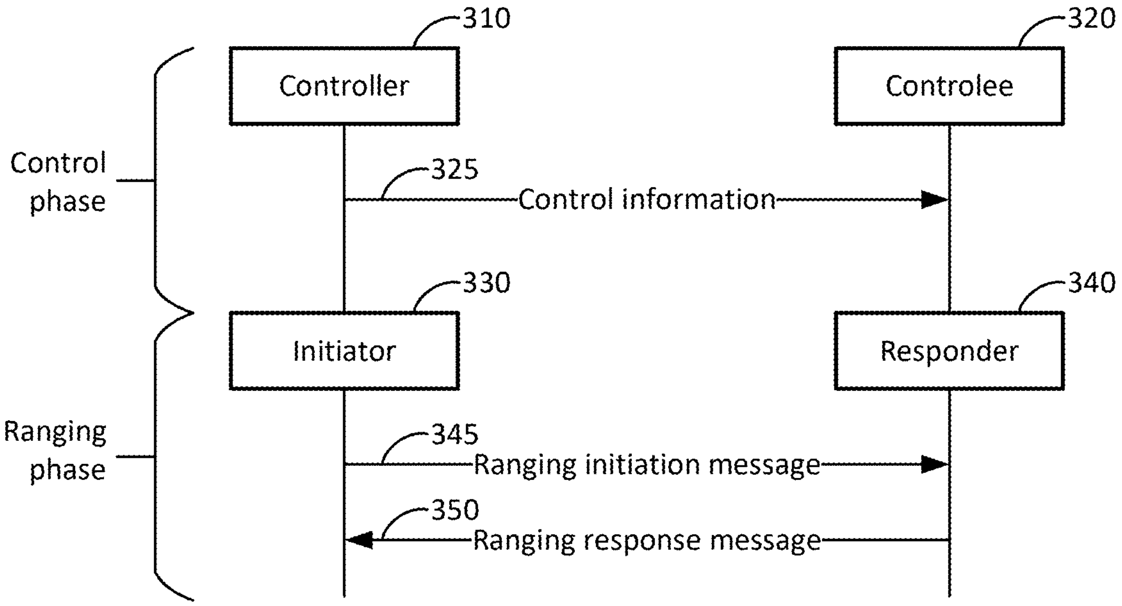
FIGS. 3A and 3B are message flow diagrams illustrating the roles different devices may assume with regard to a UWB positioning or ranging session, according to some embodiments.

FIG. 3A is a message flow diagram illustrating the roles different devices may assume with regard to a UWB ranging session (or simply a "UWB session"), which may be conducted in accordance with a relevant UWB positioning standard (e.g., IEEE 802.15.4ab). Here, each UWB device may be referred to as an enhanced ranging device (ERDEV). ERDEVs may be referred to different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs).

As indicated, for a pair of ERDEVs communicating with each other, the controller 310 is an ERDEV that sends control information 325 to a receiving ERDEV, designated as the controlee 320. The control information 325 may include parameters for the UWB ranging session, such as timing, channel, etc. Although not illustrated, the controlee 320 can send an acknowledgment to the control information 325, may negotiate changes to the parameters, and/or the like.

The exchange between controller 310 and controlee 320, including the sending of the control information 325 and subsequent related exchanges between controller 310 and controlee 320 regarding control information, may be conducted out of band (OOB) using different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round). Accordingly, some aspects of the control phase may be considered to occur in band, subsequent to the preliminary OOB exchange between the controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, the initiator 330 may initiate UWB ranging by sending a ranging initiation message 345 to the responder 340, to which the responder 340 may reply with a ranging response message 350, and timing measurements may be made of these messages (by the devices receiving the messages) to perform two-way ranging (TWR). Depending on the parameters of the control information 325, additional exchanges may be made in the ranging phase between the initiator 330 and responder 340 to allow for additional ranging measurements.

Figure 3B:
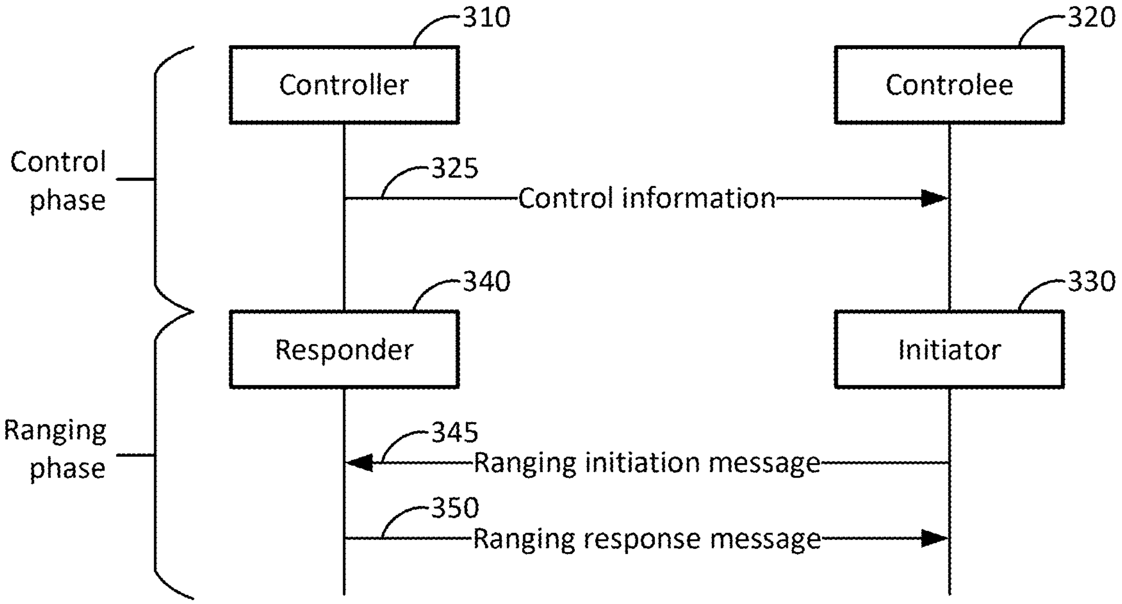

The roles of initiator 330 and responder 340 may be indicated in control information 325. Further, as indicated in FIG. 3A, the controller 310 in the control phase may be the initiator 330 in the ranging phase of the UWB session. Alternatively, as indicated in FIG. 3B, the controller 310 in the control phase may be the responder 340 in the ranging phase. The determination of which device is initiator 330 and which is responder 340 may depend on the parameters set forth in the control information 325, in which case the controlee 320 correspondingly becomes either the responder 340 or the initiator 330. According to some embodiments, a controller/initiator may conduct ranging with multiple controlees/responders.

Figure 4:
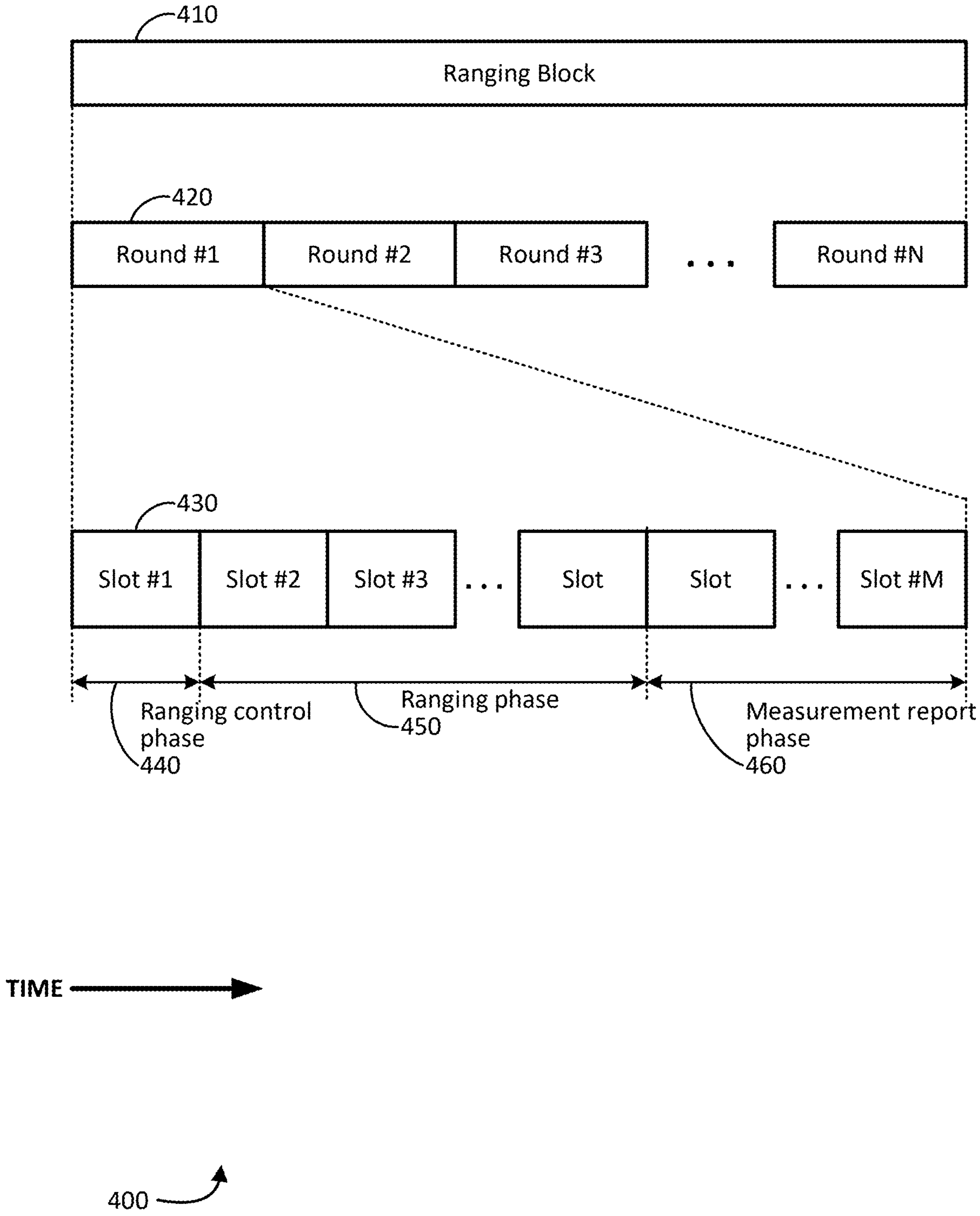
FIG. 4 is a diagram illustrating how time may be segmented and utilized within a UWB positioning session, according to some embodiments.

FIG. 4 is a diagram 400 illustrating how time may be segmented and utilized within a UWB positioning session, which may be used in some embodiments. A UWB session may occur over a period of time divided into sub-portions according to a hierarchical structure. This timing comprises one or more consecutive ranging blocks 410, which may have a configurable duration (e.g., 200 ms). (For simplicity, only one ranging block 410 is shown in FIG. 4. However, a UWB session may utilize multiple blocks, which may occur in succession. Also, although called "ranging" blocks 410, they may be used for ranging and/or sensing.) Each ranging block 410 may be split into one or more successive rounds 420 (e.g., N rounds). The number and length of the rounds may be configurable. The rounds 420 may be further split into different slots 430, which also may have a configurable number and length (e.g., 1-2 ms). According to some embodiments, multiple rounds may be used for interference handling. For example, a given responder may transmit a message within only a single round per block, and the round index may either be statistically configured by the controller or selected per a hopping pattern.

The slots within round 420 may be allocated for different purposes. For example, the initial slot may be dedicated as the ranging control phase 440, in which an initiator UWB device (e.g., an initiator anchor), transmits control information for the other UWB devices participating in a UWB session (e.g., responder anchors and/or other UWB devices). This information can include, for example, an allocation of slots among the different responder devices. During the subsequent ranging phase 450, the different responder may transmit in accordance with the allocated slot. That is, each responder may be allocated a corresponding slot in the ranging phase 450 to transmit one or more ranging/sensing signals. The ranging phase 450 may be followed by a measurement report phase 460 in which UWB anchors in a cluster may report measurements (e.g., of signals measured during the ranging phase 450). Sequential slots may be used to perform SS-TWR or DS-TWR, for example. Multiple UWB sessions can be time-multiplexed to help prevent interference with one another.

Figure 5A:
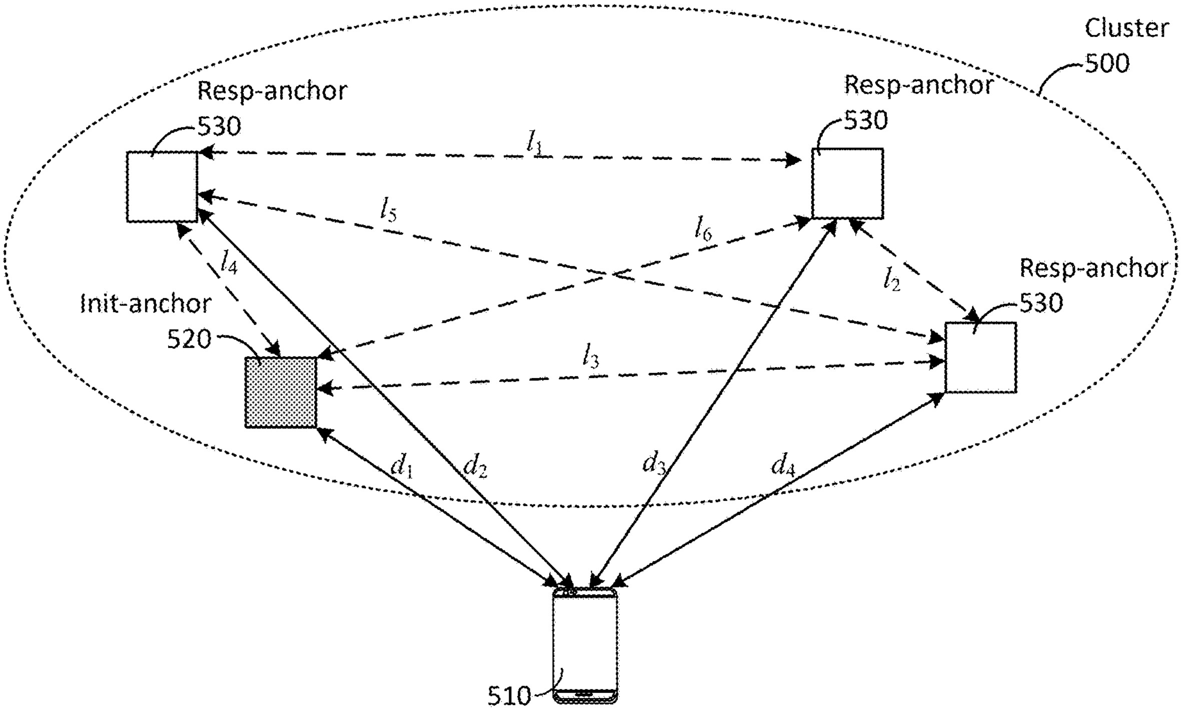
FIG. 5A is a diagram illustrating an example cluster of anchors, according to an embodiment.

FIG. 5A is a diagram illustrating an example cluster 500 of anchors, according to an embodiment. FIG. 5A combines FIGS. 2A and 2B to illustrate how a cluster 500 of anchors can determine the location of a UWB device 510 using ranging to determine values for d1-d4. In particular, cluster 500 may allow for the positioning of the UWB device 510 using TDOA measurements in UWB. In other words, the UWB device 510 can, for each anchor in the cluster 500, precisely measure the reception time of a message (e.g., downlink TDOA messages (DTM)) sent by the anchor. Using reception times and obtained coordinates of the anchors, the UWB device 510 may estimate its position. For a cluster 500 providing the TDOA, a UWB device 510 and anchors of a cluster 500 may be respectively referred to as a downlink TDOA (DT)-tag and DT-anchors. According to some embodiments, positioning supported by a cluster 500 made in accordance with applicable standards by FiRa™, the standards organization comprising a consortium of multiple member entities developing standards for UWB ranging and positioning.

A cluster is a set of anchors that exchange messages with each other to provide a localization service. According to some embodiments, OOB messaging (e.g., OOB configuration messages sent via Bluetooth) may be sent by the Init-anchor 520 to create the cluster 500 of anchors within a cluster area. To support TDOA positioning, anchors provide DTMs with each other to provide TDOA localization to DT-tags. As illustrated in FIG. 5A, a cluster 500 may comprise a single initiator anchor (Init-anchor) 520 and one or more responder anchors (Resp-anchors) 530. As described in more detail hereafter, the Init-anchor 520 can coordinate the DTM transmissions by the anchors within the cluster 500.

Figure 5B:
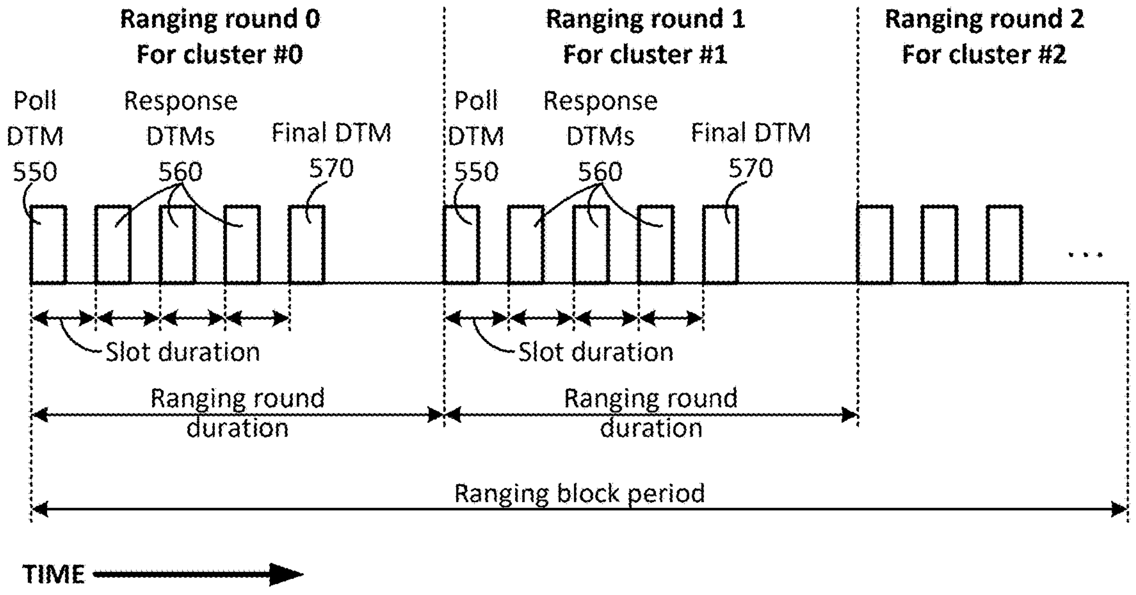
FIG. 5B is a timing diagram illustrating an example series of transmissions that may be used in UWB clusters, according to some embodiments.

FIG. 5B is a timing diagram illustrating an example series of DTM transmissions that may be used in one or more UWB sessions, according to an embodiment. As shown, different ranging rounds may be designated for different clusters. The cluster 500 of FIG. 5A, for example, may correspond with cluster #0 in FIG. 5B, and different clusters may correspond with clusters #1 and #2 in FIG. 5B. An anchor may be a part of multiple clusters, and an Init-anchor in one cluster may be a Resp-anchor in another.

As illustrated, each ranging round may comprise a poll DTM 550 transmitted by an Init-anchor of the respective cluster (e.g., Init-anchor 520), followed by response DTMs 560 transmitted by Resp-anchors (e.g., Resp-anchors 530). It can be noted that the number of responses DTMs 560 may vary in accordance with the number of Resp-anchors in a given cluster. (As such, different ranging rounds may have different numbers of response DTMs 560.) According to some embodiments, in addition to or as an alternative to providing positioning (e.g., using the differential timing to perform TDOA), the DTM messages also may be used for synchronization between the anchors. Further, a final DTM message 570 may be optional. Note that only anchors exchange messages, whereas any UWB devices that use the messages for positions may passively listen and receive packets.

Figure 6A:
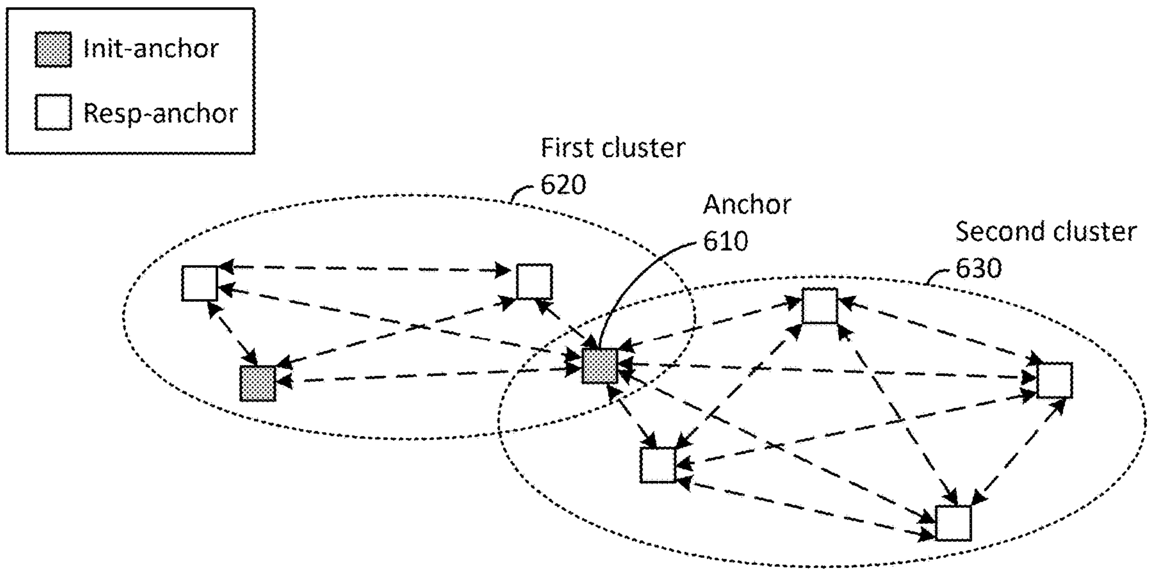
FIG. 6A is a diagram illustrating an example of how clusters may overlap, according to some embodiments.

FIG. 6A is a diagram illustrating how clusters may overlap, according to some embodiments. As noted, an anchor may be part of one or more clusters, and the overlap between two clusters may comprise one or more anchors from each cluster. In the example of FIG. 6A, for instance, anchor 610 is part of both the first cluster 620 and second cluster 630. As such, the anchor 610 will transmit DTM messages (e.g., as discussed with regard to FIG. 6B) in both the first cluster 620 and second cluster 630. Thus, multiple overlapping clusters can form a larger network of UWB anchors.

Figure 6B:
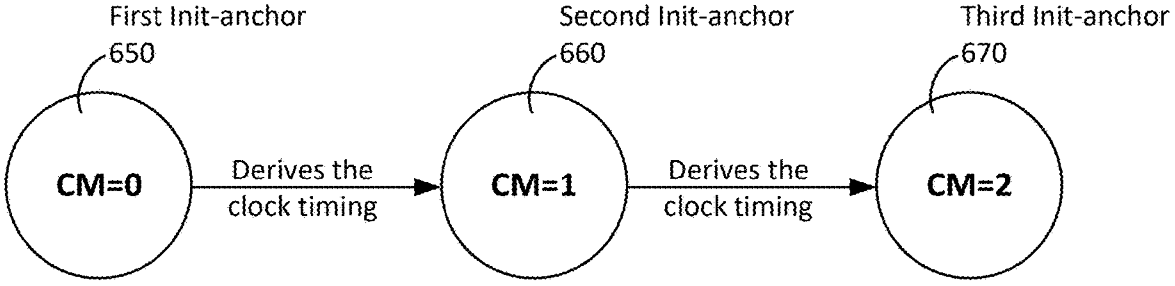
FIG. 6B is a diagram that illustrates how timing information may be communicated across clusters, according to some embodiments.

As noted, within a cluster of anchors, the Init-anchor and Resp-anchor(s) exchange messages to facilitate synchronization, maintaining a common clock (within an allowable degree of error). A network comprising multiple clusters comprising overlapping anchors may cover overlapping regions to allow UWB coverage across a larger area. Synchronization across clusters can be performed so that, as illustrated in FIG. 6B, clusters may use a common channel (e.g., a common ranging block structure) but different ranging rounds. To do so, a single anchor (typically an Init-anchor) within the network (group of clusters) can be selected as a "Global-anchor" to provide the time reference for the whole network. Overlapping anchors between clusters can communicate timing information one cluster to another.

FIG. 6B is a diagram that illustrates how this timing information may be communicated, according to some embodiments. In inter-cluster synchronization, a cost metric (CM) can be calculated to determine "a degree of proximity to the anchor providing a common time base to establish a synchronization hierarchy or tree within a multi-cluster deployment." Put differently, the cost metric for a given anchor may be considered the number of hops between a Global-anchor and given anchor. In the example illustrated in FIG. 6B, the first Init-anchor 650 has a CM of 0; a second Init-anchor 660, which derives its clock timing from the first and Init-anchor 650, has a CM of 1; and the third Init-anchor 670, which derives its clock timing from the second and Init-anchor 660, as a CM of 2. Because each hop can introduce a timing error, a lower from CM an anchor means synchronization messages from the anchor are likely to have less timing error. Thus, it may be desirable for an anchor having the lowest CM (e.g., lowest average CM across all anchors in the network) to be selected as the Global-anchor for the network, although current governing standards may not allow for the selection of such an anchor.

When inter-cluster synchronization is enabled, the CM is present in the Poll DTM message and the Response-DTM messages (that also serve as Init-anchors in another cluster). (As shown in FIG. 5, the Init-anchors transmitting the poll DTM message may increase the CM value by 1.) This allows a new anchor to scan these messages from several clusters and then select the best Init-anchor/cluster (with the lowest cost metric) for synchronization. The use of the CM in this manner can help increase the accuracy of inter-cluster synchronization.

Proposals in current related standards currently do not clearly describe how an Init-anchor is selected within a cluster. A default approach is expected to involve a "Bluetooth advertiser" that broadcasts OOB configuration messages and creates a cluster of anchors within its coverage area. However, there currently is no description of how an Init-anchor can be changed, and the CM parameter has only been defined for Init-anchors.

When there are several overlapping clusters, it would be preferable to have an Init-anchor that has maximal coverage across the clusters. An Init-anchor near the middle of a network, for example, is likely to have better coverage (lower overall CM) than an Init-anchor near the edge of the network. This may reduce errors related to multi-hop synchronization and can also enable cross-cluster TDoA for the DT-Tag. Again, however, current governing standards do not necessarily provide for the selection of such an Init-anchor as the Global-anchor.

Embodiments herein address these and other issues by providing modifications to traditional synchronization. For example, some embodiments may modify the criteria for the selection of the Global-anchor and/or protocol for synchronization across the infrastructure/network of anchors (e.g., group of anchor clusters). In particular, embodiments may use a centralized approach, for example, regarding the protocol for synchronization. Additional details are provided below.

Use cases for such synchronization embodiments may include, for example, an infrastructure of anchors that are maintained by a server (a logical controller) or a Connected Intelligent Edge (CIE). Another use case may comprise an industrial network of anchors offering DL-TDoA service to several sensors, packages, robots. Other use cases may include asset tracking in large warehouses, positioning service in a mall, hospital, airport etc. Further, the proposed ideas for synchronization enhancements provided herein with respect to UWB also can be extended to 3GPP Rel-18 sidelink (SL) scenarios in 5G NR.

According to embodiments herein, one or more criteria for Global-anchor selection can enhance the basic CM description previously described, or may be used in addition or as an alternative to a CM. Again, the Global-anchor may comprise the Init-anchor that provides a common time reference to the entire network. Further, and as previously noted, the Init-anchor for a given cluster is selected through OOB setup by the "Bluetooth advertiser."

With respect to the criteria itself, some criteria that can be used to select the Global-anchor and/or the Init-anchor with a cluster may include any combination of the following:

- Access to a global time source (such as UTC) with superior clock stability. anchors with access to a source with clock stability may be favored to those without such a source. Such sources may comprise 5G-NR base station or a GPS source, for example. Relatedly, the quality (e.g., SNR) of the received timing signal from the source by the anchor may be a factor.

Clock stability of the anchor. With regard to this factor, anchors with better clock stability would be favored over those with poorer clock stability.

Ground truth accuracy. Because the timing of other anchors relative to an anchor may be impacted by the distance of the other anchors to the anchor, accurate knowledge of the location of the anchor can help ensure reduce/minimize location-related timing errors. Thus, an anchor with greater ground truth accuracy may be more favorable than one with poorer ground accuracy as a Global-anchor/Init-anchor.

Geographic location. An anchor with maximal coverage of the region may be favorable. For example, an anchor that is closest to the center of the region served by a cluster may be selected as the Init-anchor, and/or the anchor that is closest to the center of the network may be selected as the Global-anchor. Alternatively, location can be considered among other factors. Graph-theory analysis can also be used (as described hereafter).

Prevalence of LoS links and high-quality ToA estimation. As an example, an anchor that is at the ceiling (provided, for example, the geometry of the environment is known a-priori) may be preferable to one located elsewhere, given that it is more likely to have a larger number of LoS links to other anchors. Relatedly, according to some embodiments, the RSRP of the signals received from an anchor also may be a key metric.

Power consumption information. Whether an anchor is battery-powered or connected to a stable power supply can be a factor. An anchor connected to a stable power supply may be preferable over one powered by a battery or unstable power source.

The above criteria can also be used by a new potential anchor to select from a group of Init-anchors that it wishes to synchronize with, in addition or as an alternative to using the CM. For example, a new potential anchor capable of communicating with a plurality of Init-anchors may select the Init-anchor with which it connects (e.g., joins the cluster of the Init-anchor) based on one or more of the criteria listed in FIG. 8 (which may be in addition or as an alternative to CM).

According to some embodiments, a graph-theory analysis can be used as a consideration for determining an Init-anchor (e.g., for a cluster and/or as a global-anchor) for synchronization. As previously noted, it may be used in addition to other criteria, according to some embodiments. In such embodiments, a weighted-closeness centrality (CC) can be calculated to indicate how close a node (anchor) is to the other nodes in the network. The CC, may be calculated as the average of the shortest path length from the node to every other node in the network, as follows:

$$CC_x = \frac{N}{\sum_y w_y d_{x,y}}$$

where $CC_x$ is the CC for node x, $d_{x,y}$ is the distance or number of hops between nodes x and y, and N is the total number of nodes. The parameter/weight $w_y$ indicates a quality of the link and/or anchor for achieving synchronization, related to criteria (clock stability, ground truth accuracy, etc.) described above. In other words, parameter/weight $w_y$ can be seen as a value representing one or more of the above-described criteria. (Setting this value to 1 may be an alternative way of determining a CM.)

Additionally or alternatively, mean value of the CM across all anchors, can also serve as a metric to determine the best anchor for providing a common time source. The lower the mean, the closer the time reference is to the center of the graph of nodes.

This selection may be centrally by a server, such as a CIE. In some configurations, the CIE may not be within range of all the anchors of the network (e.g., network). As such, in such configurations, control information may be exchanged over the internet, via several Bluetooth advertisers for instance.

Figure 10:
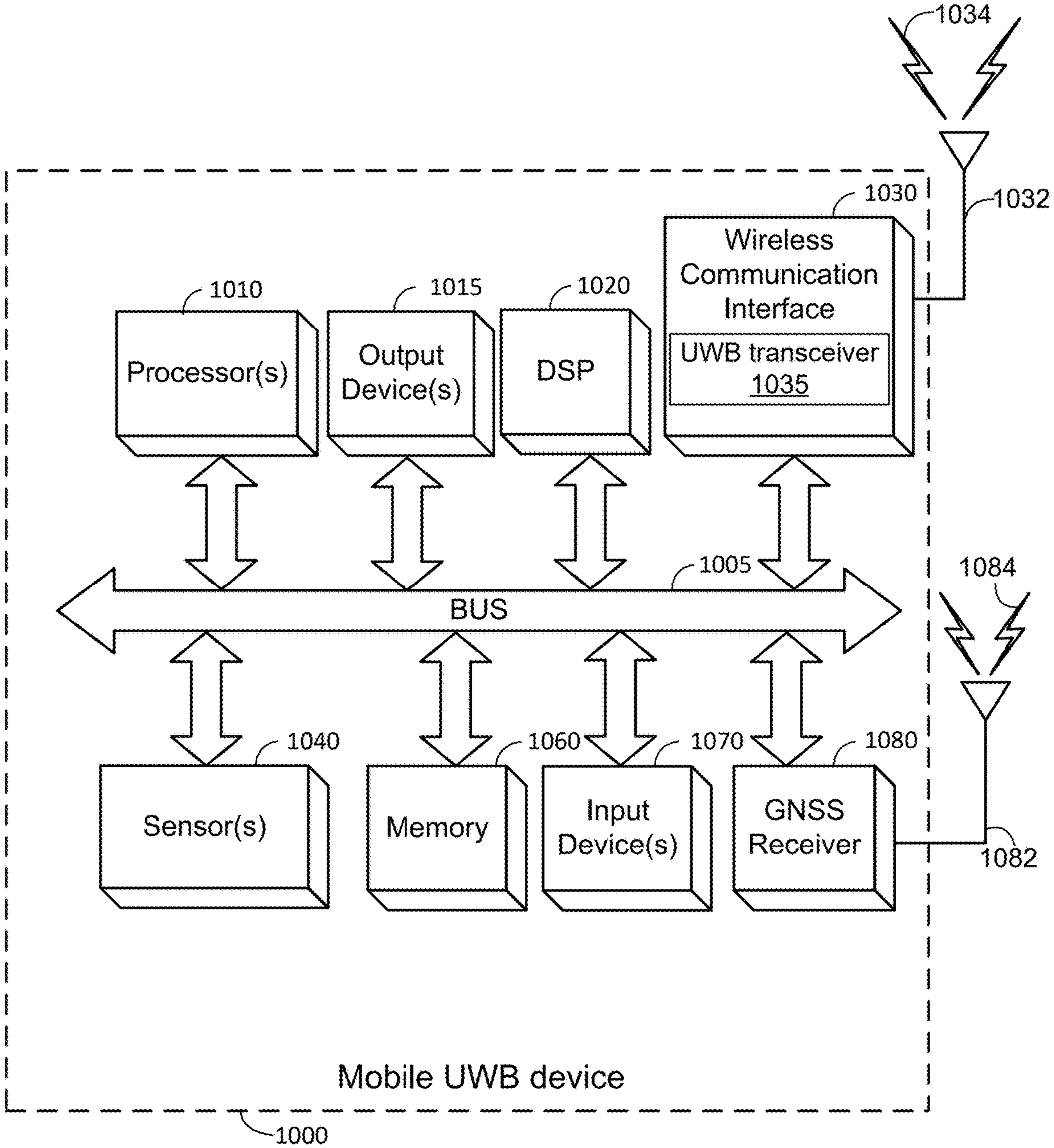
FIG. 10 is a block diagram of an embodiment of a mobile UWB device, which can be utilized in embodiments as described herein.

As noted, a CIE or other logical controller may perform Init-anchor/Global-anchor selection (e.g., as described previously) communicatively coupled with the anchors in the cluster/network. According to some embodiments, a centralized protocol may be used for updating an Init-anchor in a cluster and/or the Global-anchor in a larger network. FIG. 10 illustrates an example of the use of such a protocol.

Figure 7:
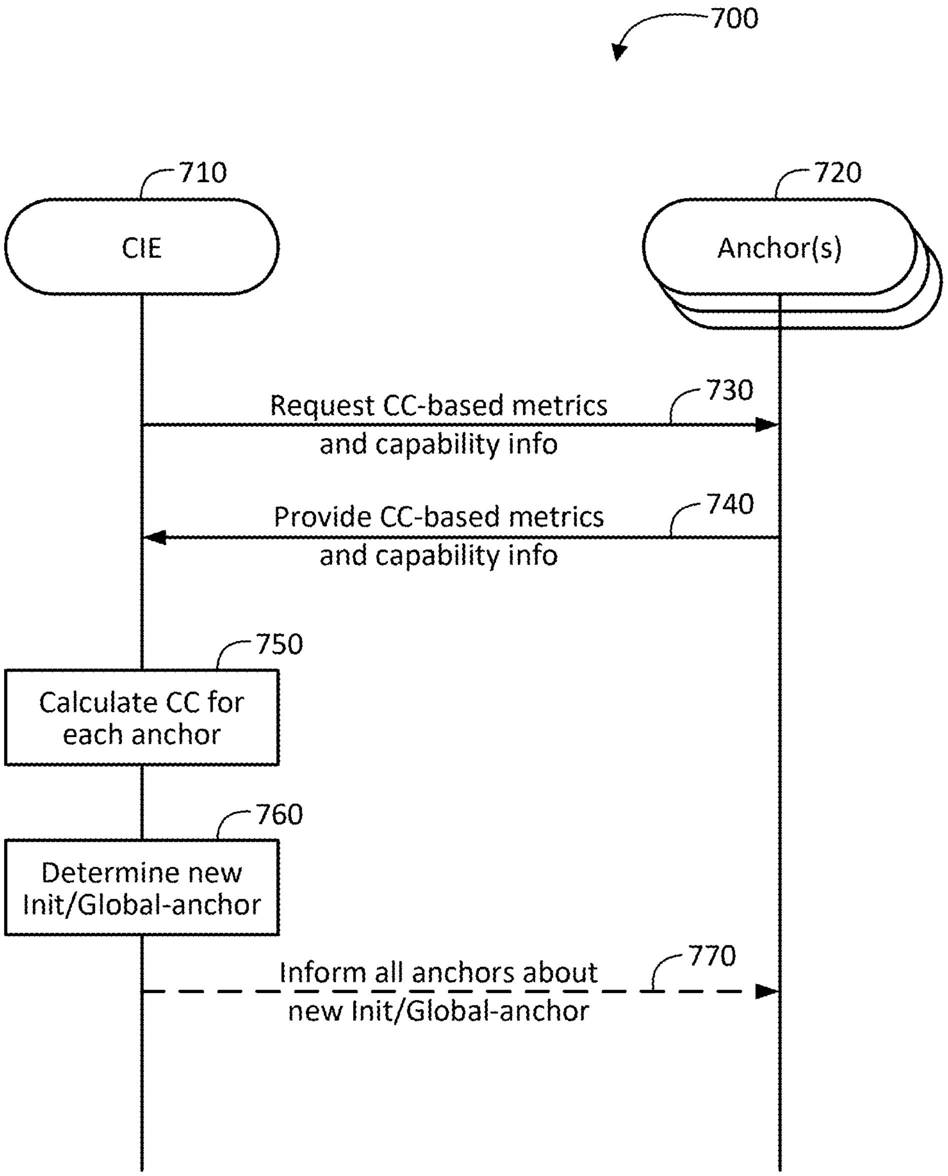
FIG. 7 is a message flow diagram of a process in which a server may make a Init-anchor or Global-anchor (Init/Global-anchor) selection, according to an embodiment.

FIG. 7 is a message flow diagram of a process 700 in which a CIE 710 may obtain the information from one or more anchors 720 used to make the Init-anchor or Global-anchor (Init/Global-anchor) selection and indicate the Init/Global-anchor selection to the network. (A similar process may be used to allow a CIE 710 to make an Init-anchor selection for a cluster.) This process 700 may be performed periodically to help optimize the Global-anchor for a network (and/or the Init-anchor for a cluster) as it grows. In particular, an Init-anchor or Global-anchor that may be optimal for one configuration may not be optimal for the configuration later on, as additional anchors join the cluster/network. Additionally or alternatively, the process may be performed based on certain triggers, such as when a new anchor joins a cluster/network, and/or when CC-based metrics (such as clock sources, RF link quality, or the like) change (e.g., beyond a threshold). According to some embodiments, messages exchanged in the process 700 may comprise OOB messages, such as Bluetooth, NR, or ethernet. Further, the process 700 may occur during a UWB DToA session within the cluster/network.

As illustrated, the process it can begin with the operation indicated by arrow 730, in which the CIE 710 to the anchor(s) 720 for CC-based metrics (e.g., one or more criteria described above for Global-anchor selection) and capability information from the various anchors in a cluster/network. Again, the message at arrow 730 may be sent periodically. In response, the anchor(s) 720 can then provide this information, as indicated by arrow 740. With this information, the CIE 710 can then calculate the CC for each anchor, as shown at block 750. This CC information can then be used to determine whether a new Init-anchor/Global-anchor should be designated for purposes of synchronization in the cluster/network, as indicated at block 760. If a new Init-anchor/Global-anchor should be designated, the CIE can then send messages to the anchor(s) 720, as shown by conditional arrow 770, to inform them of the new Init/Global global anchor. If desired, the CIE 710 may broadcast this information to potential anchors as well, and/or provide timing information to UWB anchors (e.g, over a non-UWB communication link). That said, in-band synchronization among anchors (e.g., using an Init-anchor for cluster and/or a Global-anchor for a network as described herein) may be able to achieve better synchronicity/time resolution.

The content of messages sent by the CIE 710 to the anchor(s) 720 (e.g., at arrow 770) to notify them of the new Init/Global-anchor may include additional information, according to some embodiments which may help anchor(s) 720 re-synchronize quickly. For example, according to some embodiments, timing information may be provided. This may include, for example, the time difference between the new Init/Global-anchor and the former Init/Global-anchor. According to some embodiments, the CIE 710 may also send CC metrics to the anchor(s) 720 (which the CIE 710 may have recently computed at block 750 to determine the new Init-anchor/Global-anchor), so the anchor(s) 720 do not need to compute them. Additionally or alternatively, the CIE 710 may include a ranging block index or arranging block offset, which may specify the block in which the new time reference is to be used.

Figure 8:
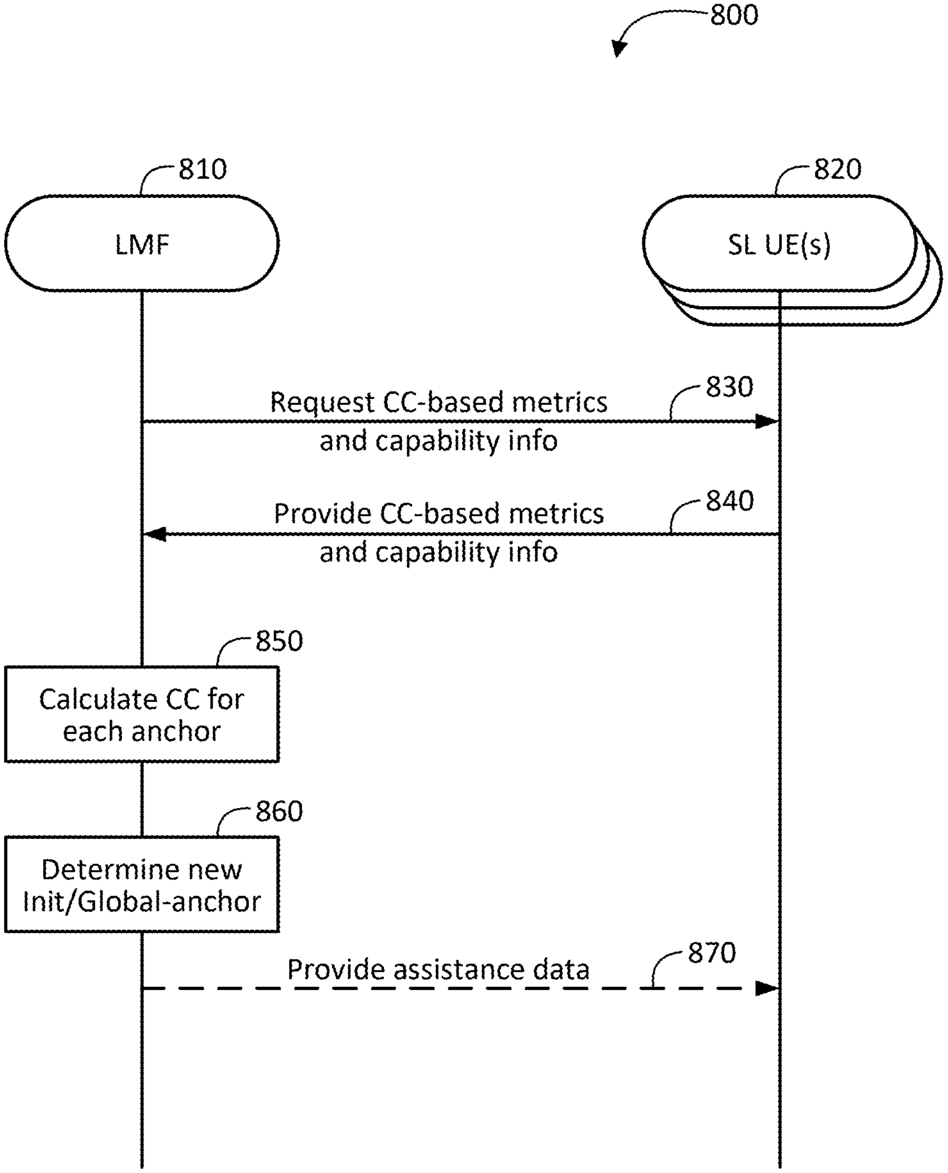
FIG. 8 is a message flow diagram of an example of a process similar to a 5G. 7 but used 5G.

As previously noted, techniques herein can be expanded beyond UWB, to applications in 5G, for example. FIG. 8 is a message flow diagram of an example of such a process 800. Generally put, operations 830-870 may be similar to corresponding operations 730-770 of FIG. 7 use the described. Here, however, messages may be sent between an LMF 810 and one or more sidelink (SL) user equipments (UEs) 820. As illustrated in FIG. 8, the information indicating the new Init/Global-anchor to the UE(s) 820 may be sent via assistance data, as indicated at arrow 870. The assistance data may further provide parameters that can help UE(s) 820 synchronize to the new Init/Global-anchor. In some embodiments, the process 800 can be extended to cases in which the LMF 810 configures a UWB infrastructure for DL-TDoA. In some embodiments, a CIE may relay messages between UWB anchors and the LMF 810. In such embodiments, the LMF may provide a time reference, and the assistance data may include parameters that help the network synchronize to the LMF-provided time. The network may synchronize to LMF-provided time rather than a clock belonging to one of the UEs in some circumstances, such as when low-cost devices are being used, in which case the LMF's time reference would be superior in terms of clock stability and accuracy. (For instance, the LMF's time reference may be derived from GPS (which in turn uses atomic clocks).)

Figure 9:
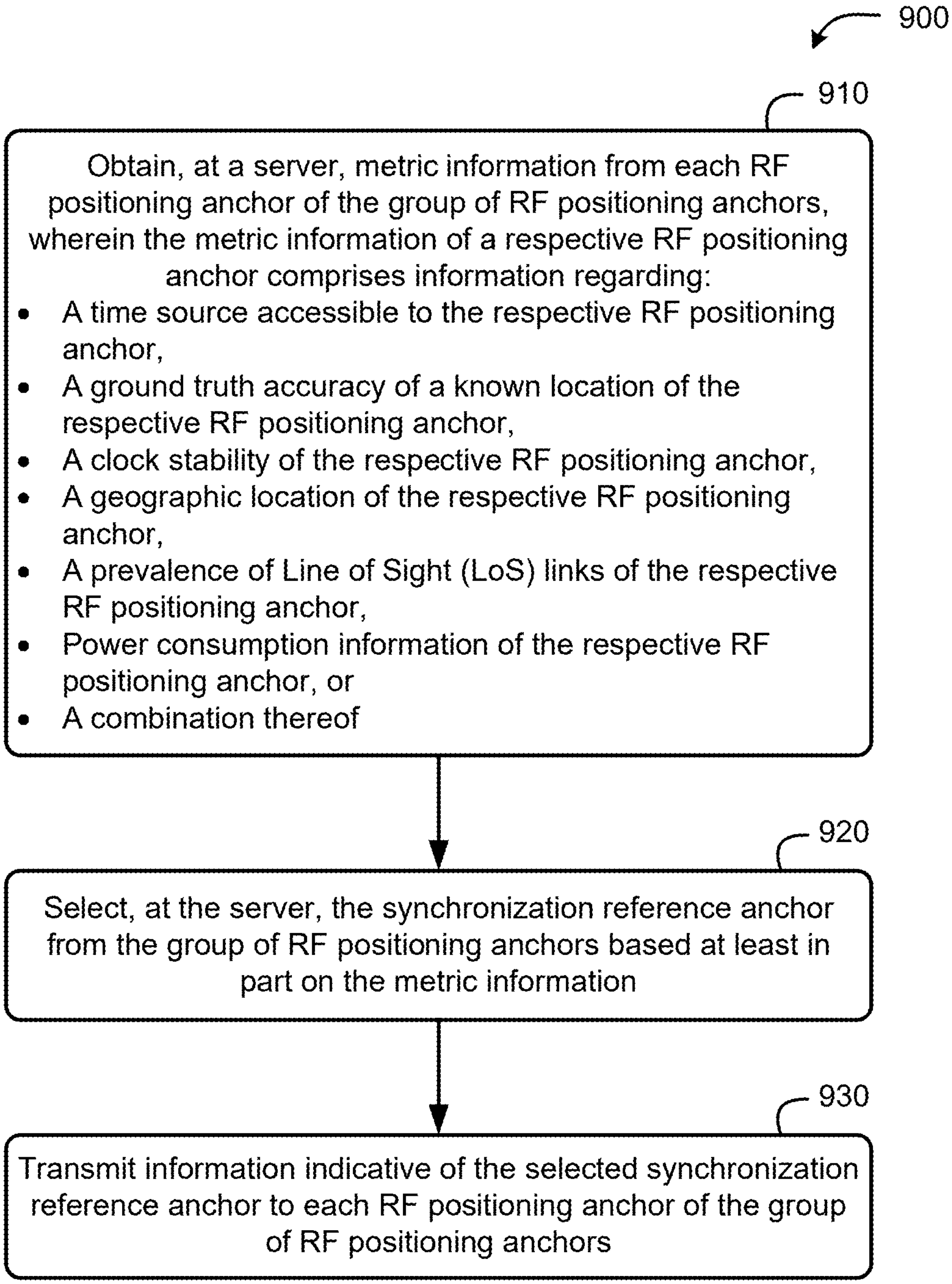
FIG. 9 is a flow diagram of a method designating a new synchronization reference anchor for a group of radio frequency (RF) positioning anchors to enable downlink Time Difference of Arrival (DL-TDoA) positioning of mobile devices, according to an embodiment.

FIG. 9 is a flow diagram of a method 900 designating a new synchronization reference anchor for a group of radio frequency (RF) positioning anchors to enable downlink Time Difference of Arrival (DL-TDoA) positioning of mobile devices, according to an embodiment. Means for performing the functionality illustrated in one or more of the blocks shown in FIG. 9 may be performed by hardware and/or software components of a server (e.g., CIE or LMF, as described herein), for example. Example components of a computer system that can operate as such a server is illustrated in FIG. 1200, which is described in more detail below.

At block 910, the functionality comprises obtaining, at a server, metric information from each RF positioning anchor of the group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof. As noted herein, embodiments may be implemented in UWB, 5G, and/or other wireless technologies. Thus, according to some embodiments, each RF positioning anchor of the group of RF positioning anchors may comprise a UWB anchor. In such embodiments, the server may comprise a CIE. In some embodiments, each RF positioning anchor of the group of RF positioning anchors comprises a Fifth Generation (5G) New Radio (NR) anchor. In such embodiments, the server may comprise an LMF. As illustrated in FIGS. 7 and 8, obtaining the metric information from each RF positioning anchor of the group of RF positioning anchors may comprise sending a request for the metric information from the server to each RF positioning anchor of the group of RF positioning anchors, and, responsive to sending the request, receiving metric information at the server from each RF positioning anchor of the group of RF positioning anchors. In such embodiments, sending the request for the metric information and receiving the metric information may be performed using an OOB message of an RF technology different than an RF technology used by the RF positioning anchors to provide the DL-TDoA positioning.

Figure 12:
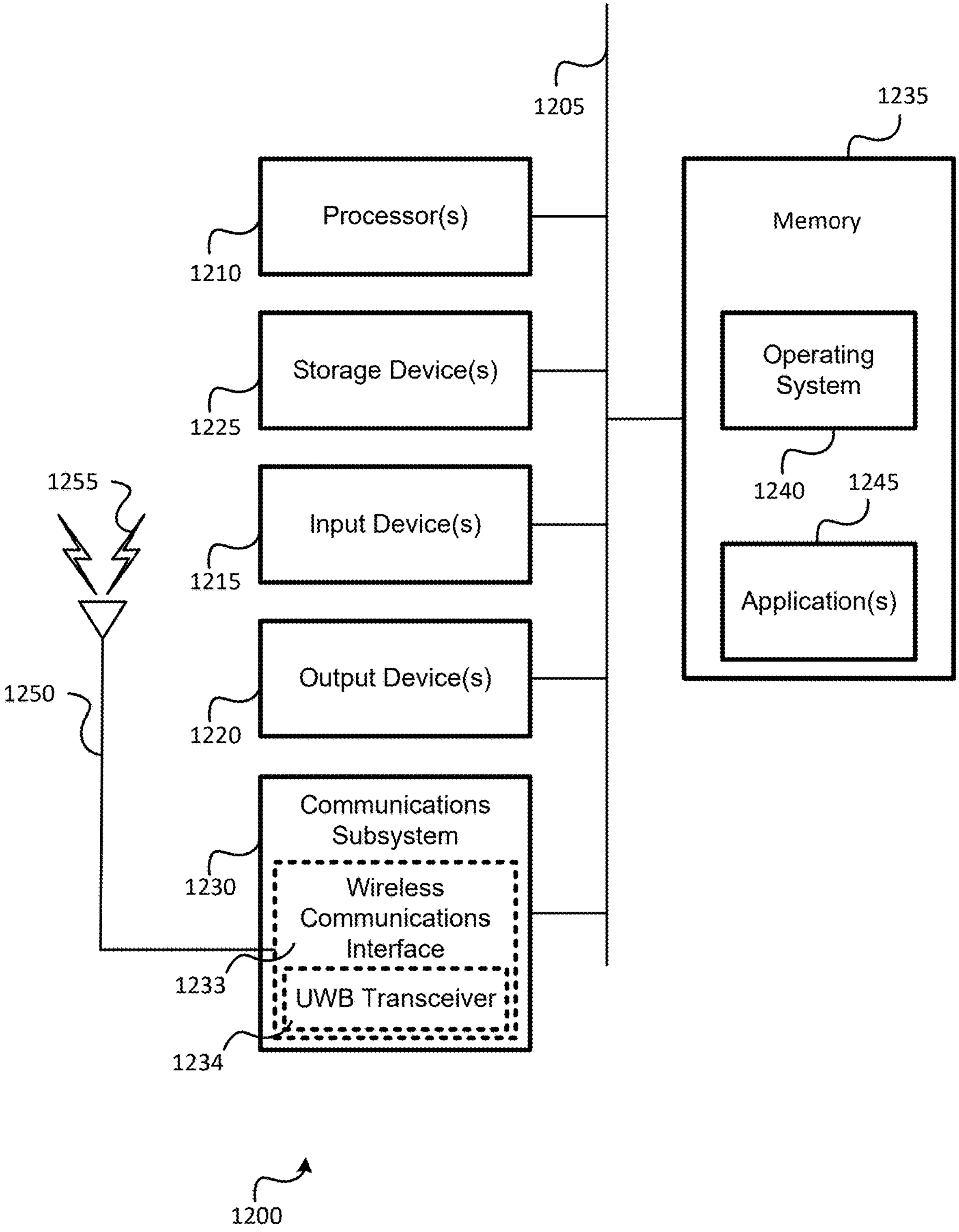
FIG. 12 is a block diagram of an embodiment of a computer system, which can be utilized in embodiments as described herein.

Means for performing functionality at block 910 may comprise a bus 1205, one or more processors 1210, one or more storage devices 1225, a communications subsystem 1230, a memory 1235 (which may include the operating system 1240 and one or more applications 1245), and/or other components of a computer system 1200, as illustrated in FIG. 12.

At block 920, the functionality comprises selecting, at the server, the synchronization reference anchor from the group of RF positioning anchors based at least in part on the metric information. As described in the embodiments herein, the selection may be based on a combined value of weighted metric information. As described herein with respect to determining a CC value, a distance (e.g., number of hops) and/or a number of nodes may also be used. According to some embodiments, selecting the synchronization reference anchor may be further based at least in part on information regarding a cost metric (CM) for each RF positioning anchor of the group of RF positioning anchors. In some embodiments, the group of RF positioning anchors may comprise a cluster of UWB anchors, and the synchronization reference anchor may comprise an Init-anchor. Additionally or alternatively, the group of RF positioning anchors may comprise a network of two or more clusters of UWB anchors and the synchronization reference anchor they comprise a Global-anchor.

Means for performing functionality at block 920 may comprise a bus 1205, one or more processors 1210, one or more storage devices 1225, a communications subsystem 1230, a memory 1235 (which may include the operating system 1240 and one or more applications 1245), and/or other components of a computer system 1200, as illustrated in FIG. 12.

At block 930, the functionality comprises transmitting information indicative of the selected synchronization reference anchor to each RF positioning anchor of the group of RF positioning anchors. As noted in the embodiments above, this information can enable each RF positioning anchor to synchronize to the selected synchronization reference anchor. In some embodiments, this transmission may occur using GOB communication, allowing for potential anchors to receive the information prior to joining the network/cluster. In some embodiments, in-band synchronization among anchors may be able to achieve better synchronicity/time resolution.

Means for performing functionality at block 930 may comprise a bus 1205, one or more processors 1210, one or more storage devices 1225, a communications subsystem 1230, a memory 1235 (which may include the operating system 1240 and one or more applications 1245), and/or other components of a computer system 1200, as illustrated in FIG. 12.

As described in the embodiments herein, one or more additional features may be implemented, depending on desired functionality. According to some embodiments, for example, selecting the synchronization reference anchor may comprise determining a weighted-closeness centrality value for each RF positioning anchor of the group of RF positioning anchors, wherein the weighted-closeness centrality value for each RF positioning anchor is based on the metric information of the respective RF positioning anchor. This weighted-closeness centrality value may comprise the CC value described herein. According to some embodiments, the method may further comprise sending, to each RF positioning anchor of the group of RF positioning anchors, information indicative of the weighted-closeness centrality value to the respective RF positioning anchor. Additionally or alternatively, the method may comprise transmitting timing information to enable each RF positioning anchor of the group of RF positioning anchors to synchronize with the selected synchronization reference anchor.

FIG. 10 is a block diagram of an embodiment of a mobile UWB device 1000, which can be utilized as described herein above. It should be noted that FIG. 10 is meant only to provide a generalized illustration of various components, any or all of which may be utilized as appropriate. The mobile UWB device 1000 may correspond with a mobile device or tag for positioning as described herein. Additionally or alternatively, the mobile UWB device 1000 may serve as an anchor in certain circumstances (e.g., when the position of the mobile UWB device 1000 is known). Furthermore, as previously noted, the functionality of the UE discussed in the previously described embodiments may be executed by one or more of the hardware and/or software components illustrated in FIG. 10.

The mobile UWB device 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The mobile UWB device 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The mobile UWB device 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1000 to communicate with other devices as described in the embodiments above. The wireless communication interface 1030 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

As illustrated, the wireless indication interface 1030 may further comprise a UWB transceiver 1035. The UWB transceiver 1035 may be operated to perform the UWB operations described herein. Further, the wireless communications interface 1030 may comprise one or more additional communication technologies with which the GOB functionalities described herein may be performed. According to some embodiments, the UWB transceiver 1035 may be one of a plurality of UWB transceivers of the mobile UWB device 1000. Further, the UWB transceiver may be used for functionality in addition to the UWB positioning functionality described herein. Although illustrated as part of the wireless communication interface 1030, the UWB transceiver 1035 may be separate from the wireless communication interface 1030 in some embodiments.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the mobile UWB device 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various+storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile UWB device 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the mobile UWB device 1000 (and/or processor(s) 1010 or DSP 1020 within mobile UWB device 1000). In some embodiments, then, such code and/or instructions can be used to configure and/or adapt a general-purpose computer (or other device) to perform one or more operations in accordance with the described methods.

Figure 11:
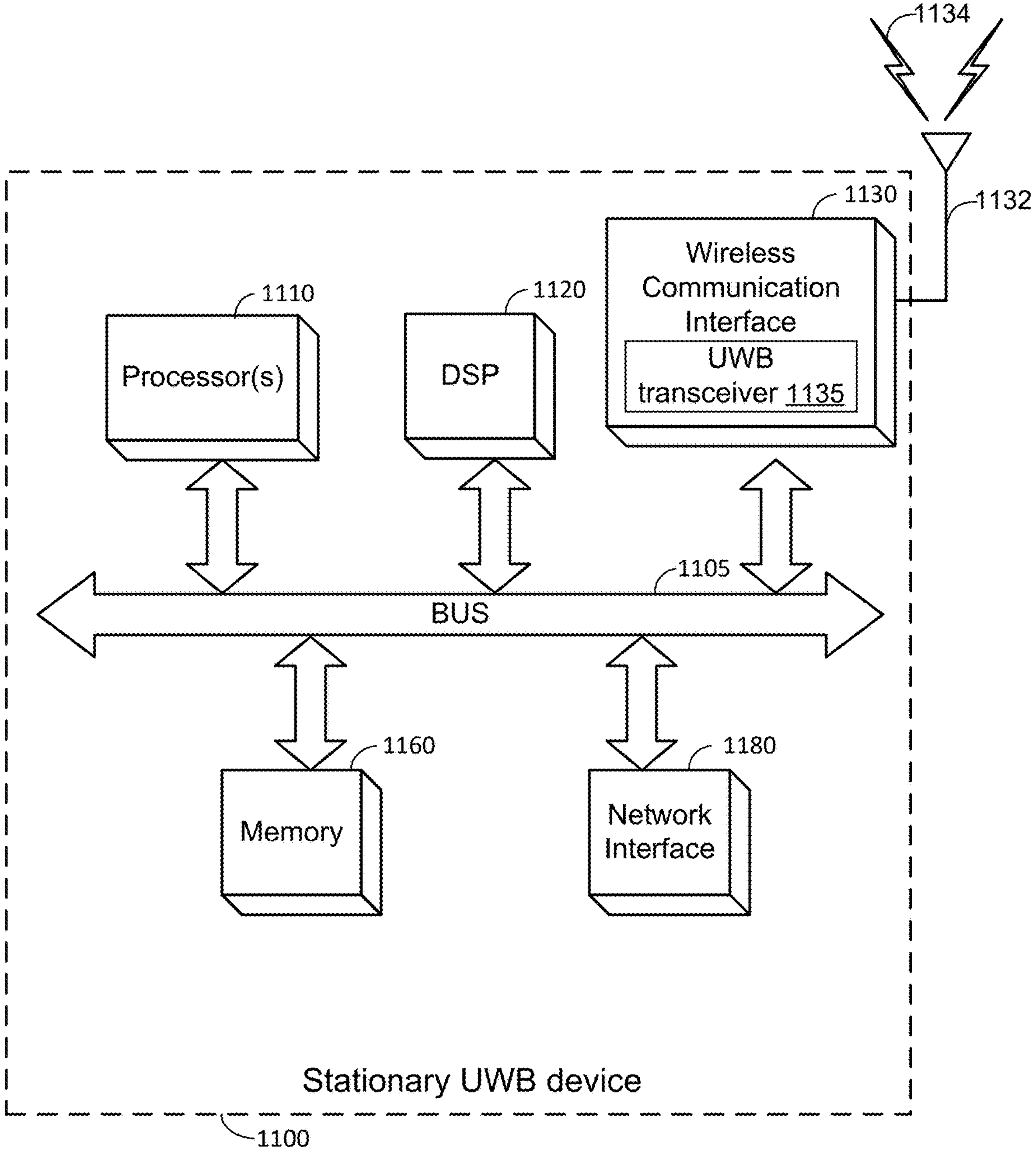
FIG. 11 is a block diagram of an embodiment of a stationary UWB device, which can be utilized in embodiments as described herein.

FIG. 11 is a block diagram of an embodiment of a stationary UWB device 1100, which can be utilized as described herein above. For example, a stationary UWB device 1100 may be used as a UWB anchor as described herein. It should be noted that FIG. 11 is meant only to provide a generalized illustration of various components, any or all of which may be utilized as appropriate. In some embodiments, the stationary UWB device 1100 may correspond to an anchor UWB having a known location, which may be used to determine the location of other UWB devices, including mobile UWB devices. According to some embodiments, the stationary UWB device 1100 may be permanently stationary or temporarily stationary.

The stationary UWB device 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The stationary UWB device 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1100 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

As illustrated, the wireless indication interface 1130 may further comprise a UWB transceiver 1135. The UWB transceiver 1135 may be operated to perform the UWB operations described herein. Further, the wireless communications interface 1130 may comprise one or more additional communication technologies with which the GOB functionalities described herein may be performed. According to some embodiments, the UWB transceiver 1135 may be one of a plurality of UWB transceivers of the stationary UWB device 1100. Further, the UWB transceiver may be used for functionality in addition to the UWB positioning functionality described herein. Although illustrated as part of the wireless communication interface 1130, the UWB transceiver 1135 may be separate from the wireless communication interface 1130 in some embodiments.

The stationary UWB device 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein. In some embodiments, the stationary UWB device 1100 may be communicatively coupled with one or more servers and/or other stationary UWB devices via the network interface 1180.

In many embodiments, the stationary UWB device 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the stationary UWB device 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the stationary UWB device 1100 (and/or processor(s) 1110 or DSP 1120 within stationary UWB device 1100). In some embodiments, then, such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of a server as described in the embodiments herein (e.g., server/CIE/LMF described in reference to FIGS. 7-9). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may (optionally, as indicated by dotted lines) comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Optionally, these one or more wireless transceivers may comprise a UWB transceiver 1234. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of designating a synchronization reference anchor for a group of radio frequency (RF) positioning anchors to enable downlink Time Difference of Arrival (DL-TDoA) positioning of mobile devices, the method comprising: obtaining, at a server, metric information from each RF positioning anchor of the group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof, selecting, at the server, the synchronization reference anchor from the group of RF positioning anchors based at least in part on the metric information; and transmitting information indicative of the selected synchronization reference anchor to each RF positioning anchor of the group of RF positioning anchors.

Clause 2. The method of clause 1, wherein each RF positioning anchor of the group of RF positioning anchors comprises a UWB anchor.

Clause 3. The method of clause 2 wherein the server comprises a Connected Intelligent Edge (CIE).

Clause 4. The method of any one of clauses 2-3 wherein group of RF positioning anchors comprises a cluster of UWB anchors, and the synchronization reference anchor comprises an Init-anchor.

Clause 5. The method of any one of clauses 2-4 wherein group of RF positioning anchors comprises a network of two or more clusters of UWB anchors and the synchronization reference anchor comprises a Global-anchor.

Clause 6. The method of any one of clauses 2-5 wherein selecting the synchronization reference anchor is further based at least in part on information regarding a cost metric (CM) for each RF positioning anchor of the group of RF positioning anchors.

Clause 7. The method of clause 6 wherein each RF positioning anchor of the group of RF positioning anchors comprises a Fifth Generation (5G) New Radio (NR) anchor.

Clause 8. The method of clause 7 wherein the server comprises a Location Management Function (LMF).

Clause 9. The method of any one of clauses 1-8 wherein obtaining the metric information from each RF positioning anchor of the group of RF positioning anchors comprises: sending a request for the metric information from the server to each RF positioning anchor of the group of RF positioning anchors; and responsive to sending the request, receiving metric information at the server from each RF positioning anchor of the group of RF positioning anchors.

Clause 10. The method of any one of clauses 1-9 wherein sending the request for the metric information and receiving the metric information is performed using an out-of-band (OOB) message of an RF technology different than an RF technology used by the RF positioning anchors to provide the DL-TDoA positioning.

Clause 11. The method of any one of clauses 1-10 wherein selecting the synchronization reference anchor comprises determining a weighted-closeness centrality value for each RF positioning anchor of the group of RF positioning anchors, wherein the weighted-closeness centrality value for each RF positioning anchor is based on the metric information of the respective RF positioning anchor.

Clause 12. The method of clause 11 further comprising sending, to each RF positioning anchor of the group of RF positioning anchors, information indicative of the weighted-closeness centrality value to the respective RF positioning anchor.

Clause 13. The method of any one of clauses 1-12 further comprising transmitting timing information to enable each RF positioning anchor of the group of RF positioning anchors to synchronize with the selected synchronization reference anchor.

Clause 14. A server comprising: a transceiver; a memory; and one or more processors communicatively coupled with the transceiver and the memory, wherein the one or more processors are configured to: obtain metric information from each radio frequency (RF) positioning anchor of a group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof, select a synchronization reference anchor from the group of RF positioning anchors based at least in part on the metric information; and transmit, via the transceiver, information indicative of the selected synchronization reference anchor to each RF positioning anchor of the group of RF positioning anchors.

Clause 15. The server of clause 14, wherein each RF positioning anchor of the group of RF positioning anchors comprises a UWB anchor.

Clause 16. The server of clause 15 wherein the server comprises a Connected Intelligent Edge (CIE).

Clause 17. The server of any one of clauses 15-16 wherein group of RF positioning anchors comprises a cluster of UWB anchors, and the synchronization reference anchor comprises an Init-anchor.

Clause 18. The server of any one of clauses 15-17 wherein group of RF positioning anchors comprises a network of two or more clusters of UWB anchors and the synchronization reference anchor comprises a Global-anchor.

Clause 19. The server of any one of clauses 15-18 wherein selecting the synchronization reference anchor is further based at least in part on information regarding a cost metric (CM) for each RF positioning anchor of the group of RF positioning anchors.

Clause 20. The server of clause 14 wherein each RF positioning anchor of the group of RF positioning anchors comprises a Fifth Generation (5G) New Radio (NR) anchor.

Clause 21. The server of clause 20 wherein the server comprises a Location Management Function (LMF).

Clause 22. The server of any one of clauses 14-21 wherein, to obtain the metric information from each RF positioning anchor of the group of RF positioning anchors, the one or more processors are configured to send a request for the metric information from the server to each RF positioning anchor of the group of RF positioning anchors; and responsive to sending the request, receiving metric information at the server from each RF positioning anchor of the group of RF positioning anchors.

Clause 23. The server of clause 22 wherein the one or more processors are configured to send the request for the metric information and receive the metric information using an out-of-band (OOB) message of an RF technology different than an RF technology used by the RF positioning anchors to provide a DL-TDoA positioning.

Clause 24. The server of any one of clauses 14-23 wherein, to select the synchronization reference anchor, the one or more processors are configured to determine a weighted-closeness centrality value for each RF positioning anchor of the group of RF positioning anchors, wherein the weighted-closeness centrality value for each RF positioning anchor is based on the metric information of the respective RF positioning anchor.

Clause 25. The server of clause 24 wherein the one or more processors are further configured to send, to each RF positioning anchor of the group of RF positioning anchors, information indicative of the weighted-closeness centrality value to the respective RF positioning anchor.

Clause 26. The server of any one of clauses 14-25 wherein the one or more processors are further configured to transmit timing information to enable each RF positioning anchor of the group of RF positioning anchors to synchronize with the selected synchronization reference anchor.

Clause 27. An apparatus for designating a synchronization reference anchor for a group of radio frequency (RF) positioning anchors to enable downlink Time Difference of Arrival (DL-TDoA) positioning of mobile devices, the apparatus comprising: means for obtaining metric information from each RF positioning anchor of the group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof; means for selecting the synchronization reference anchor from the group of RF positioning anchors based at least in part on the metric information; and means for transmitting information indicative of the selected synchronization reference anchor to each RF positioning anchor of the group of RF positioning anchors.

Clause 28. The apparatus of clause 27, wherein each RF positioning anchor of the group of RF positioning anchors comprises a UWB anchor.

Clause 29. The apparatus of clause 28 wherein the apparatus comprises a Connected Intelligent Edge (CIE).

Clause 30. The apparatus of any one of clauses 28-29 wherein group of RF positioning anchors comprises a cluster of UWB anchors, and the synchronization reference anchor comprises an Init-anchor.

Clause 31. The apparatus of any one of clauses 28-30 wherein group of RF positioning anchors comprises a network of two or more clusters of UWB anchors and the synchronization reference anchor comprises a Global-anchor.

Clause 32. The apparatus of any one of clauses 27-31 wherein selecting the synchronization reference anchor is based at least in part on information regarding a cost metric (CM) for each RF positioning anchor of the group of RF positioning anchors.

Clause 33. The apparatus of clause 27 wherein each RF positioning anchor of the group of RF positioning anchors comprises a Fifth Generation (5G) New Radio (NR) anchor.

Clause 34. The apparatus of clause 28 wherein the apparatus comprises a Location Management Function (LMF).

Clause 35. The apparatus of any one of clauses 27-34 wherein the means for obtaining the metric information from each RF positioning anchor of the group of RF positioning anchors comprises: means for sending a request for the metric information to each RF positioning anchor of the group of RF positioning anchors; and means for, responsive to sending the request, receiving metric information from each RF positioning anchor of the group of RF positioning anchors.

Clause 36. The apparatus of clause 35 wherein the means for sending the request for the metric information and receiving the metric information is configured to use an out-of-band (OOB) message of an RF technology different than an RF technology used by the RF positioning anchors to provide the DL-TDoA positioning.

Clause 37. The apparatus of any one of clauses 27-36 wherein the means for selecting the synchronization reference anchor comprises means for determining a weighted-closeness centrality value for each RF positioning anchor of the group of RF positioning anchors, wherein the weighted-closeness centrality value for each RF positioning anchor is based on the metric information of the respective RF positioning anchor.

Clause 38. The apparatus of clause 37 further comprising means for sending, to each RF positioning anchor of the group of RF positioning anchors, information indicative of the weighted-closeness centrality value to the respective RF positioning anchor.

Clause 39. The apparatus of any one of clauses 27-38 further comprising means for transmitting timing information to enable each RF positioning anchor of the group of RF positioning anchors to synchronize with the selected synchronization reference anchor.

Clause 40. A non-transitory computer-readable medium storing instructions for designating a synchronization reference anchor for a group of radio frequency (RF) positioning anchors to enable downlink Time Difference of Arrival (DL-TDoA) positioning of mobile devices, the instructions comprising code for: obtaining metric information from each RF positioning anchor of the group of RF positioning anchors, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, power consumption information of the respective RF positioning anchor, or a combination thereof, selecting the synchronization reference anchor from the group of RF positioning anchors based at least in part on the metric information; and transmitting information indicative of the selected synchronization reference anchor to each RF positioning anchor of the group of RF positioning anchors.

Clause 41. The computer-readable medium of clause 40, wherein each RF positioning anchor of the group of RF positioning anchors comprises a UWB anchor.

Clause 42. The computer-readable medium of clause 41 wherein group of RF positioning anchors comprises a cluster of UWB anchors, and the synchronization reference anchor comprises an Init-anchor.

Clause 43. The computer-readable medium of any one of clauses 41-42 wherein group of RF positioning anchors comprises a network of two or more clusters of UWB anchors and the synchronization reference anchor comprises a Global-anchor.

Clause 44. The computer-readable medium of any one of clauses 40-43 wherein selecting the synchronization reference anchor is further based at least in part on information regarding a cost metric (CM) for each RF positioning anchor of the group of RF positioning anchors.

Clause 45. The computer-readable medium of clause 40 wherein each RF positioning anchor of the group of RF positioning anchors comprises a Fifth Generation (5G) New Radio (NR) anchor.

Clause 46. The computer-readable medium of any one of clauses 40-45 wherein the code for obtaining the metric information from each RF positioning anchor of the group of RF positioning anchors comprises code for: sending a request for the metric information to each RF positioning anchor of the group of RF positioning anchors; and responsive to sending the request, receiving metric information from each RF positioning anchor of the group of RF positioning anchors.

Clause 47. The computer-readable medium of clause 46 wherein sending the request for the metric information and receiving the metric information is performed using an out-of-band (OOB) message of an RF technology different than an RF technology used by the RF positioning anchors to provide the DL-TDoA positioning.

Clause 48. The computer-readable medium of any one of clauses 40-47 wherein the code for selecting the synchronization reference anchor comprises code for determining a weighted-closeness centrality value for each RF positioning anchor of the group of RF positioning anchors, wherein the weighted-closeness centrality value for each RF positioning anchor is based on the metric information of the respective RF positioning anchor.

Clause 49. The computer-readable medium of clause 48 wherein the instructions further comprise code for sending, to each RF positioning anchor of the group of RF positioning anchors, information indicative of the weighted-closeness centrality value to the respective RF positioning anchor.

Clause 50. The computer-readable medium of any one of clauses 40-49 wherein the instructions further comprise code for transmitting timing information to enable each RF positioning anchor of the group of RF positioning anchors to synchronize with the selected synchronization reference anchor.

What is claimed is:

1. A method of designating a synchronization reference anchor for a group of radio frequency (RF) positioning anchors to enable downlink Time Difference of Arrival (DL-TDoA) positioning of mobile devices, the method comprising:

obtaining, at a server, metric information from each RF positioning anchor of the group of RF positioning anchors, wherein the metric information of a respective RF positioning anchor comprises information indicating:

a time source accessible to the respective RF positioning anchor, a ground truth accuracy of a known location of the respective RF positioning anchor, a clock stability of the respective RF positioning anchor, a geographic location of the respective RF positioning anchor, power consumption information of the respective RF positioning anchor, or a combination thereof, determining a weighted-closeness centrality value for each RF positioning anchor of the group of RF positioning anchors, wherein the weighted-closeness centrality value for each RF positioning anchor is based on:

the metric information of the respective RF positioning anchor, and a value indicative of a number of hops of the respective RF positioning anchor to a plurality of other RF positioning anchors of the group of RF positioning anchors;

selecting, at the server, the synchronization reference anchor from the group of RF positioning anchors based at least in part on the weighted-closeness centrality value; and transmitting information indicative of the selected synchronization reference anchor to each RF positioning anchor of the group of RF positioning anchors.

2. The method of claim 1, wherein each RF positioning anchor of the group of RF positioning anchors comprises a UWB anchor.

3. The method of claim 2, wherein the server comprises a Connected Intelligent Edge (CIE).

4. The method of claim 2, wherein group of RF positioning anchors comprises a cluster of UWB anchors, and the synchronization reference anchor comprises an Init-anchor.

5. The method of claim 2, wherein group of RF positioning anchors comprises a network of two or more clusters of UWB anchors and the synchronization reference anchor comprises a Global-anchor.

6. The method of claim 1, wherein selecting the synchronization reference anchor is further based at least in part on information regarding a cost metric (CM) for each RF positioning anchor of the group of RF positioning anchors.

7. The method of claim 1, wherein each RF positioning anchor of the group of RF positioning anchors comprises a Fifth Generation (5G) New Radio (NR) anchor.

8. The method of claim 7, wherein the server comprises a Location Management Function (LMF).

9. The method of claim 1, wherein obtaining the metric information from each RF positioning anchor of the group of RF positioning anchors comprises:

sending a request for the metric information from the server to each RF positioning anchor of the group of RF positioning anchors; and responsive to sending the request, receiving metric information at the server from each RF positioning anchor of the group of RF positioning anchors.

10. The method of claim 9, wherein sending the request for the metric information and receiving the metric information is performed using an out-of-band (OOB) message of an RF technology different than an RF technology used by the RF positioning anchors to provide the DL-TDoA positioning.

11. The method of claim 1, further comprising sending, to each RF positioning anchor of the group of RF positioning anchors, information indicative of the weighted-closeness centrality value to the respective RF positioning anchor.

12. The method of claim 1, further comprising transmitting timing information to enable each RF positioning anchor of the group of RF positioning anchors to synchronize with the selected synchronization reference anchor.

13. A server comprising:

a transceiver;

a memory; and one or more processors communicatively coupled with the transceiver and the memory, wherein the one or more processors are configured to:

obtain metric information from each radio frequency (RF) positioning anchor of a group of RF positioning anchors, wherein the metric information of a respective RF positioning anchor comprises information indicating:

a time source accessible to the respective RF positioning anchor, a ground truth accuracy of a known location of the respective RF positioning anchor, a clock stability of the respective RF positioning anchor, a geographic location of the respective RF positioning anchor, power consumption information of the respective RF positioning anchor, or a combination thereof, determine a weighted-closeness centrality value for each RF positioning anchor of the group of RF positioning anchors, wherein the weighted-closeness centrality value for each RF positioning anchor is based on:

the metric information of the respective RF positioning anchor, and a value indicative of a number of hops of the respective RF positioning anchor to a plurality of other RF positioning anchors of the group of RF positioning anchors;

select a synchronization reference anchor from the group of RF positioning anchors based at least in part on the weighted-closeness centrality value; and transmit, via the transceiver, information indicative of the selected synchronization reference anchor to each RF positioning anchor of the group of RF positioning anchors.

14. The server of claim 13, wherein each RF positioning anchor of the group of RF positioning anchors comprises a UWB anchor.

15. The server of claim 14, wherein the server comprises a Connected Intelligent Edge (CIE).

16. The server of claim 13, wherein selecting the synchronization reference anchor is further based at least in part on information regarding a cost metric (CM) for each RF positioning anchor of the group of RF positioning anchors.

17. The server of claim 13, wherein each RF positioning anchor of the group of RF positioning anchors comprises a Fifth Generation (5G) New Radio (NR) anchor and the server comprises a Location Management Function (LMF).

18. The server of claim 13, wherein, to obtain the metric information from each RF positioning anchor of the group of RF positioning anchors, the one or more processors are configured to:

send a request for the metric information from the server to each RF positioning anchor of the group of RF positioning anchors; and responsive to sending the request, receiving metric information at the server from each RF positioning anchor of the group of RF positioning anchors.

19. The server of claim 18, wherein the one or more processors are configured to send the request for the metric information and receive the metric information using an out-of-band (OOB) message of an RF technology different than an RF technology used by the RF positioning anchors to provide a DL-TDoA positioning.

20. The server of claim 13, wherein the one or more processors are further configured to send, to each RF positioning anchor of the group of RF positioning anchors, information indicative of the weighted-closeness centrality value to the respective RF positioning anchor.

21. The server of claim 13, wherein the one or more processors are further configured to transmit timing information to enable each RF positioning anchor of the group of RF positioning anchors to synchronize with the selected synchronization reference anchor.

22. An apparatus for designating a synchronization reference anchor for a group of radio frequency (RF) positioning anchors to enable downlink Time Difference of Arrival (DL-TDoA) positioning of mobile devices, the apparatus comprising:

means for obtaining metric information from each RF positioning anchor of the group of RF positioning anchors, wherein the metric information of a respective RF positioning anchor comprises information indicating:

a time source accessible to the respective RF positioning anchor, a ground truth accuracy of a known location of the respective RF positioning anchor, a clock stability of the respective RF positioning anchor, a geographic location of the respective RF positioning anchor, power consumption information of the respective RF positioning anchor, or a combination thereof, means for determining a weighted-closeness centrality value for each RF positioning anchor of the group of RF positioning anchors, wherein the weighted-closeness centrality value for each RF positioning anchor is based on:

the metric information of the respective RF positioning anchor, and a value indicative of a number of hops of the respective RF positioning anchor to a plurality of other RF positioning anchors of the group of RF positioning anchors;

means for selecting the synchronization reference anchor from the group of RF positioning anchors based at least in part on the weighted-closeness centrality value; and means for transmitting information indicative of the selected synchronization reference anchor to each RF positioning anchor of the group of RF positioning anchors.

23. The apparatus of claim 22, wherein selecting the synchronization reference anchor is based at least in part on information regarding a cost metric (CM) for each RF positioning anchor of the group of RF positioning anchors.

24. The apparatus of claim 22, wherein each RF positioning anchor of the group of RF positioning anchors comprises a Fifth Generation (5G) New Radio (NR) anchor and the apparatus comprises a Location Management Function (LMF).

25. The apparatus of claim 22, wherein the means for obtaining the metric information from each RF positioning anchor of the group of RF positioning anchors comprises:

means for sending a request for the metric information to each RF positioning anchor of the group of RF positioning anchors; and means for, responsive to sending the request, receiving metric information from each RF positioning anchor of the group of RF positioning anchors.

26. The apparatus of claim 22, further comprising means for transmitting timing information to enable each RF positioning anchor of the group of RF positioning anchors to synchronize with the selected synchronization reference anchor.

27. A non-transitory computer-readable medium storing instructions for designating a synchronization reference anchor for a group of radio frequency (RF) positioning anchors to enable downlink Time Difference of Arrival (DL-TDoA) positioning of mobile devices, the instructions comprising code for:

obtaining metric information from each RF positioning anchor of the group of RF positioning anchors, wherein the metric information of a respective RF positioning anchor comprises information indicating:

a time source accessible to the respective RF positioning anchor, a ground truth accuracy of a known location of the respective RF positioning anchor, a clock stability of the respective RF positioning anchor, a geographic location of the respective RF positioning anchor, power consumption information of the respective RF positioning anchor, or a combination thereof, determining a weighted-closeness centrality value for each RF positioning anchor of the group of RF positioning anchors, wherein the weighted-closeness centrality value for each RF positioning anchor is based on:

the metric information of the respective RF positioning anchor, and a value indicative of a number of hops of the respective RF positioning anchor to a Plurality of other RF positioning anchors of the group of RF positioning anchors;

selecting the synchronization reference anchor from the group of RF positioning anchors based at least in part on the weighted-closeness centrality value; and transmitting information indicative of the selected synchronization reference anchor to each RF positioning anchor of the group of RF positioning anchors.

* * * * *